(12) United States Patent
Lynes

(10) Patent No.: US 12,466,877 B2
(45) Date of Patent: Nov. 11, 2025

(54) METALLOTHIONEIN ANTIBODIES AND THEIR USE

(71) Applicant: UNIVERSITY OF CONNECTICUT, Farmington, CT (US)

(72) Inventor: Michael Lynes, Farmington, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 908 days.

(21) Appl. No.: 17/625,476

(22) PCT Filed: Jul. 15, 2020

(86) PCT No.: PCT/US2020/042064
§ 371 (c)(1),
(2) Date: Jan. 7, 2022

(87) PCT Pub. No.: WO2021/011608
PCT Pub. Date: Jan. 21, 2021

(65) Prior Publication Data
US 2022/0306731 A1    Sep. 29, 2022

Related U.S. Application Data

(60) Provisional application No. 62/874,340, filed on Jul. 15, 2019.

(51) Int. Cl.
*C07K 16/18* (2006.01)
*A61K 47/68* (2017.01)

(52) U.S. Cl.
CPC .......... *C07K 16/18* (2013.01); *A61K 47/6843* (2017.08); *C07K 2317/24* (2013.01); *C07K 2317/55* (2013.01)

(58) Field of Classification Search
CPC .................. C07K 16/18; C07K 2317/24; C07K 2317/55; C07K 2317/76; C07K 2317/51; C07K 2317/515; C07K 2317/52; C07K 2317/56; C07K 2317/565; A61K 47/6843; A61K 47/6803; A61K 2039/505; A61P 3/10; A61P 29/00; A61P 1/00; A61P 35/00; A61P 1/16
See application file for complete search history.

(56) References Cited

U.S. PATENT DOCUMENTS 8,916,152 B2 *   12/2014   Hernandez Miguez .................... A61P 35/00
                                                                      424/139.1

FOREIGN PATENT DOCUMENTS

WO    2013007678    1/2013
WO    2019143767    7/2019

OTHER PUBLICATIONS

Haynes et al., "Metallothionein 2a gene expression is increased in subcutaneous adipose tissue of type 2 diabetic patients", Molecular Genetics and Metabolism, vol. 108, No. 1, Jul. 25, 2012 (Jul. 25, 2012), p. 90-94, XP028962327.
Kunik V, et al., (2012). "Structural Consensus among Antibodies Defines the Antigen Binding Site," PLoS Comput Biol 8(2): e1002388. doi:10.1371/journal.pcbi.1002388.
Kunik V, et al., Y (2012). "Paratome: an online tool for systematic identification of antigen-binding regions in antibodies based on sequence or structure," Nucleic Acids Res. Jul. 2012;40(Web Server issue):W521-4.
Prudêncio et al., "The silent path to thousands of merozoites: the Plasmodium liver stage," Nature Reviews Microbiology. 2006;4(11):849-856.
Rathore D, et al. "An Immunologically Cryptic Epitope of Plasmodium falciparum Circumsporozoite Protein Facilitates Liver Cell Recognition and Induces Protective Antibodies That Block Liver Cell Invasion," The Journal of Biological Chemistry. 2005;280(21):20524-20529.
Singh et al. "Plasmodium Circumsporozoite Protein Promotes the Development of the Liver Stages of the Parasite," Cell. 2007;131(3):492-504.
Yang et al, "Polymorphisms in metallothionein-1 and -2 genes associated with the risk of type 2 diabetes mellitus and its complications", American Journal of Physiology: Endocrinology and Metabolism.,vol. 294, No. 5, May 1, 2008 (May 1, 2008), p. E987-E992.
Devisscher, et al., (2014) "Role of metallothioneins as danger signals in the pathogenesis of colitis," J Pathol 233: 89-100.

* cited by examiner

*Primary Examiner* — Misook Yu
*Assistant Examiner* — Grace H Lunde
(74) *Attorney, Agent, or Firm* — MCDONNELL BOEHNEN HULBERT & BERGHOFF LLP

(57) ABSTRACT

Disclosed herein are isolated anti-metallothionein antibodies, or fragments thereof, and their use in treating intestinal inflammation, diabetes, pre-diabetes, impaired glucose tolerance, hepatitis, and/or inflammatory liver disease.

18 Claims, 5 Drawing Sheets
Specification includes a Sequence Listing.

CLUSTAL O(1.2.4) multiple sequence alignment

```
UC1MT    AVLMSQTPLSLPVSLGDQASISCRSSQSIVHSNGNTYLEWYLQKPGQSPKLLIYKVSNRF   60
VK1      DVVMTQSPLSLPVTLGQPASISCRSSQSIVHSNGNTYLEWFQQRPGQSPRLLIYKVSNRF   60
VK2      DVVMTQSPLSLPVTLGQPASISCRSSQSIVHSNGNTYLEWYLQRPGQSPRLLIYKVSNRF   60
VK3      DVVMTQSPLSLPVTLGQPASISCRSSQSIVHSNGNTYLEWYLQRPGQSPRLLIYKVSNRF   60
                *:*:***********:****************************:********

UC1MT    SGVPDRFSGSGSGTDFTLKISRVEAEDLGIYYCFQGSHVPFAFGSGTKLEIE   112
VK1      SGVPDRFSGSGSGTDFTLKISRVEAEDVGVYYCFQGSHVPFTFGQGTKLEIK   112
VK2      SGVPDRFSGSGSGTDFTLKISRVEAEDVGVYYCFQGSHVPFAFGQGTKLEIK   112
VK3      SGVPDRFSGSGSGTDFTLKISRVEAEDLGIYYCFQGSHVPFAFGQGTKLEIK   112
         **************************:*:***********:**:******:
```

|        | L-Hum1          | L-Hum2          | L-Hum3          | L-P      |
|--------|-----------------|-----------------|-----------------|----------|
| H-Hum1 | 0.09&.07/L,L    | 0.28&.106/L,L   | 0.01&.007/L,L   | 0.107/L  |
| H-Hum2 | 0.143&.088/L,L  | 0.22&.212/M,M   | 0.12&.016/M,L   | 0.254/M  |
| H-Hum3 | 0.542&.31/L,M   | 0.547&.504/M,M  | 0.478&.443/M,M  | 0.613/H  |
| H-Hum4 | 0.225&.124/L,M  | 0.59&.551/H,H   | 0.548&.491/M,M  | 0.617/H  |
| H-Hum5 | 0.618&.475/M,H  | 0.612&.578/H,H  | 0.577&.374/M,H  | 0.681/H  |
| H-P    | 0.466&.281/M,M  | 0.613/H         | 0.668/H         | 0.665/H  |

SEQUENCE LISTING

```
<160> NUMBER OF SEQ ID NOS: 25

<210> SEQ ID NO 1
<211> LENGTH: 13
<212> TYPE: PRT
<213> ORGANISM: Artificial Sequence
<220> FEATURE:
<223> OTHER INFORMATION: Synthetic peptide

<400> SEQUENCE: 1

Gln Ser Ile Val His Ser Asn Gly Asn Thr Tyr Leu Glu
1               5                   10

<210> SEQ ID NO 2

<400> SEQUENCE: 2

000
```

```
<210> SEQ ID NO 3
<211> LENGTH: 9
<212> TYPE: PRT
<213> ORGANISM: Artificial Sequence
<220> FEATURE:
<223> OTHER INFORMATION: Synthetic peptide
<220> FEATURE:
<221> NAME/KEY: MISC_FEATURE
<222> LOCATION: (9)..(9)
<223> OTHER INFORMATION: Xaa can be A or T

<400> SEQUENCE: 3

Phe Gln Gly Ser His Val Pro Phe Xaa
1               5

<210> SEQ ID NO 4
<211> LENGTH: 8
<212> TYPE: PRT
<213> ORGANISM: Artificial Sequence
<220> FEATURE:
<223> OTHER INFORMATION: Synthetic peptide

<400> SEQUENCE: 4

Gly Phe Ser Leu Ser Arg Tyr Gly
1               5

<210> SEQ ID NO 5
<211> LENGTH: 6
<212> TYPE: PRT
<213> ORGANISM: Artificial Sequence
<220> FEATURE:
<223> OTHER INFORMATION: Synthetic peptide

<400> SEQUENCE: 5

Ile Trp Ser Gly Gly Ser
1               5

<210> SEQ ID NO 6
<211> LENGTH: 6
<212> TYPE: PRT
<213> ORGANISM: Artificial Sequence
<220> FEATURE:
<223> OTHER INFORMATION: Synthetic peptide

<400> SEQUENCE: 6

Trp Leu Leu Pro Gly Tyr
1               5

<210> SEQ ID NO 7
<211> LENGTH: 112
<212> TYPE: PRT
<213> ORGANISM: Artificial Sequence
<220> FEATURE:
<223> OTHER INFORMATION: Synthetic peptide

<400> SEQUENCE: 7

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Ile Val His Ser
            20                  25                  30

Asn Gly Asn Thr Tyr Leu Glu Trp Phe Gln Gln Arg Pro Gly Gln Ser
        35                  40                  45

Pro Arg Leu Leu Ile Tyr Lys Val Ser Asn Arg Phe Ser Gly Val Pro
    50                  55                  60
```

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Gly
                85                  90                  95

Ser His Val Pro Phe Thr Phe Gly Gln Gly Thr Lys Leu Glu Ile Lys
            100                 105                 110

<210> SEQ ID NO 8
<211> LENGTH: 112
<212> TYPE: PRT
<213> ORGANISM: Artificial Sequence
<220> FEATURE:
<223> OTHER INFORMATION: Synthetic peptide

<400> SEQUENCE: 8

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Ile Val His Ser
            20                  25                  30

Asn Gly Asn Thr Tyr Leu Glu Trp Tyr Leu Gln Arg Pro Gly Gln Ser
        35                  40                  45

Pro Arg Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Gly
                85                  90                  95

Ser His Val Pro Phe Ala Phe Gly Gln Gly Thr Lys Leu Glu Ile Lys
            100                 105                 110

<210> SEQ ID NO 9
<211> LENGTH: 112
<212> TYPE: PRT
<213> ORGANISM: Artificial Sequence
<220> FEATURE:
<223> OTHER INFORMATION: Synthetic peptide

<400> SEQUENCE: 9

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Ile Val His Ser
            20                  25                  30

Asn Gly Asn Thr Tyr Leu Glu Trp Tyr Leu Gln Arg Pro Gly Gln Ser
        35                  40                  45

Pro Arg Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Ile Tyr Tyr Cys Phe Gln Gly
                85                  90                  95

Ser His Val Pro Phe Ala Phe Gly Gln Gly Thr Lys Leu Glu Ile Lys
            100                 105                 110

<210> SEQ ID NO 10
<211> LENGTH: 107
<212> TYPE: PRT
<213> ORGANISM: Artificial Sequence
<220> FEATURE:
<223> OTHER INFORMATION: Synthetic peptide

<400> SEQUENCE: 10

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 11
<211> LENGTH: 117
<212> TYPE: PRT
<213> ORGANISM: Artificial Sequence
<220> FEATURE:
<223> OTHER INFORMATION: Synthetic peptide

<400> SEQUENCE: 11

Gln Val Gln Leu Gln Glu Ser Gly Pro Gly Leu Val Lys Pro Ser Glu
1               5                   10                  15

Thr Leu Ser Leu Thr Cys Thr Val Ser Gly Phe Ser Leu Ser Arg Tyr
            20                  25                  30

Gly Val Ser Trp Ile Arg Gln Pro Pro Gly Lys Gly Leu Glu Trp Ile
        35                  40                  45

Gly Val Ile Trp Ser Gly Gly Ser Thr Asn Tyr Asn Pro Ser Leu Lys
    50                  55                  60

Ser Arg Val Thr Ile Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Trp Leu Leu Pro Gly Tyr Phe Asp Val Trp Gly Gln Gly Thr Thr
            100                 105                 110

Val Thr Val Ser Ser
        115

<210> SEQ ID NO 12
<211> LENGTH: 117
<212> TYPE: PRT
<213> ORGANISM: Artificial Sequence
<220> FEATURE:
<223> OTHER INFORMATION: Synthetic peptide

<400> SEQUENCE: 12

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Ser Arg Tyr
            20                  25                  30

Gly Val His Trp Ile Arg Gln Pro Pro Gly Lys Gly Leu Glu Trp Ile
        35                  40                  45

Gly Val Ile Trp Ser Gly Gly Ser Thr Asp Tyr Asn Pro Ser Leu Lys
    50                  55                  60

```
Ser Arg Val Thr Ile Ser Val Asp Thr Ser Lys Asn Gln Phe Ser Leu
 65                  70                  75                  80

Lys Leu Ser Ser Val Thr Ala Ala Asp Thr Ala Val Tyr Tyr Cys Ala
                 85                  90                  95

Arg Trp Leu Leu Pro Gly Tyr Phe Asp Val Trp Gly Gln Gly Thr Thr
            100                 105                 110

Val Thr Val Ser Ser
        115
```

```
<210> SEQ ID NO 13
<211> LENGTH: 117
<212> TYPE: PRT
<213> ORGANISM: Artificial Sequence
<220> FEATURE:
<223> OTHER INFORMATION: Synthetic peptide

<400> SEQUENCE: 13

Gln Val Gln Leu Gln Glu Ser Gly Pro Gly Leu Val Lys Pro Ser Glu
  1               5                  10                  15

Thr Leu Ser Ile Thr Cys Thr Val Ser Gly Phe Ser Leu Ser Arg Tyr
                 20                  25                  30

Gly Val His Trp Val Arg Gln Pro Pro Gly Lys Gly Leu Glu Trp Ile
             35                  40                  45

Gly Val Ile Trp Ser Gly Gly Ser Thr Asp Tyr Asn Pro Ser Phe Lys
 50                  55                  60

Ser Arg Val Thr Ile Ser Lys Asp Asn Ser Lys Asn Gln Val Ser Phe
 65                  70                  75                  80

Lys Leu Ser Ser Leu Thr Ala Ala Asp Thr Ala Val Tyr Tyr Cys Ala
                 85                  90                  95

Arg Trp Leu Leu Pro Gly Tyr Phe Asp Val Trp Gly Gln Gly Thr Thr
            100                 105                 110

Val Thr Val Ser Ser
        115
```

```
<210> SEQ ID NO 14
<211> LENGTH: 117
<212> TYPE: PRT
<213> ORGANISM: Artificial Sequence
<220> FEATURE:
<223> OTHER INFORMATION: Synthetic peptide

<400> SEQUENCE: 14

Gln Val Gln Leu Gln Glu Ser Gly Pro Gly Leu Val Lys Pro Ser Glu
  1               5                  10                  15

Thr Leu Ser Ile Thr Cys Thr Val Ser Gly Phe Ser Leu Ser Arg Tyr
                 20                  25                  30

Gly Val His Trp Val Arg Gln Ser Pro Gly Lys Gly Leu Glu Trp Leu
             35                  40                  45

Gly Val Ile Trp Ser Gly Gly Ser Thr Asp Tyr Asn Ala Ala Phe Lys
 50                  55                  60

Ser Arg Leu Ser Ile Ser Lys Asp Asn Ser Lys Asn Gln Val Phe Phe
 65                  70                  75                  80

Lys Met Ser Ser Leu Thr Ala Ala Asp Thr Ala Arg Tyr Tyr Cys Ala
                 85                  90                  95

Arg Trp Leu Leu Pro Gly Tyr Phe Asp Val Trp Gly Gln Gly Thr Thr
            100                 105                 110

Val Thr Val Ser Ser
        115
```

<210> SEQ ID NO 15
<211> LENGTH: 117
<212> TYPE: PRT
<213> ORGANISM: Artificial Sequence
<220> FEATURE:
<223> OTHER INFORMATION: Synthetic peptide

<400> SEQUENCE: 15

Glu Val Gln Leu Val Glu Ser Gly Gly Gly Leu Val Gln Pro Gly Gly
1               5                   10                  15

Ser Leu Arg Leu Ser Cys Ala Val Ser Gly Phe Ser Leu Ser Arg Tyr
            20                  25                  30

Gly Val His Trp Val Arg Gln Ala Pro Gly Lys Gly Leu Glu Trp Val
        35                  40                  45

Ser Val Ile Trp Ser Gly Gly Ser Thr Asp Tyr Ala Asp Ser Val Lys
    50                  55                  60

Gly Arg Phe Thr Ile Ser Lys Asp Asn Ala Lys Lys Ser Val Tyr Leu
65                  70                  75                  80

Gln Met Asn Ser Leu Arg Ala Glu Asp Thr Ala Val Tyr Tyr Cys Ala
                85                  90                  95

Arg Trp Leu Leu Pro Gly Tyr Phe Asp Val Trp Gly Gln Gly Thr Thr
            100                 105                 110

Val Thr Val Ser Ser
        115

<210> SEQ ID NO 16
<211> LENGTH: 330
<212> TYPE: PRT
<213> ORGANISM: Artificial Sequence
<220> FEATURE:
<223> OTHER INFORMATION: Synthetic peptide

<400> SEQUENCE: 16

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Gln Ser Thr Tyr Arg Val Val Ser Val Leu Thr Val Leu

```
                180                 185                 190
His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
            245                 250                 255

Pro Ser Asp Ile Ala Val Glu Trp Glu Ser Asn Gly Gln Pro Glu Asn
        260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 17
<211> LENGTH: 37
<212> TYPE: PRT
<213> ORGANISM: Artificial Sequence
<220> FEATURE:
<223> OTHER INFORMATION: Synthetic peptide

<400> SEQUENCE: 17

His Asp Glu Phe Glu Arg His Ala Glu Gly Thr Phe Thr Ser Asp Val
1               5                   10                  15

Ser Ser Tyr Leu Glu Gly Gln Ala Ala Lys Glu Phe Ile Ala Trp Leu
            20                  25                  30

Val Lys Gly Arg Gly
        35

<210> SEQ ID NO 18
<211> LENGTH: 33
<212> TYPE: PRT
<213> ORGANISM: Artificial Sequence
<220> FEATURE:
<223> OTHER INFORMATION: Synthetic peptide

<400> SEQUENCE: 18

His Ala Asp Gly Ser Phe Ser Asp Glu Met Asn Thr Ile Leu Asp Asn
1               5                   10                  15

Leu Ala Ala Arg Asp Phe Ile Asn Trp Leu Ile Gln Thr Lys Ile Thr
            20                  25                  30

Asp

<210> SEQ ID NO 19
<211> LENGTH: 95
<212> TYPE: PRT
<213> ORGANISM: Artificial Sequence
<220> FEATURE:
<223> OTHER INFORMATION: Synthetic peptide

<400> SEQUENCE: 19

Met Ala Ala Ala Arg Leu Cys Leu Ser Leu Leu Leu Leu Ser Thr Cys
1               5                   10                  15
```

```
Val Ala Leu Leu Leu Gln Pro Leu Leu Gly Ala Gln Gly Ala Pro Leu
            20                  25                  30

Glu Pro Val Tyr Pro Gly Asp Asn Ala Thr Pro Glu Gln Met Ala Gln
        35                  40                  45

Tyr Ala Ala Asp Leu Arg Arg Tyr Ile Asn Met Leu Thr Arg Pro Arg
 50                  55                  60

Tyr Gly Lys Arg His Lys Glu Asp Thr Leu Ala Phe Ser Glu Trp Gly
 65                  70                  75                  80

Ser Pro His Ala Ala Val Pro Arg Glu Leu Ser Pro Leu Asp Leu
                85                  90                  95
```

```
<210> SEQ ID NO 20
<211> LENGTH: 97
<212> TYPE: PRT
<213> ORGANISM: Artificial Sequence
<220> FEATURE:
<223> OTHER INFORMATION: Synthetic peptide

<400> SEQUENCE: 20

Met Leu Gly Asn Lys Arg Leu Gly Leu Ser Gly Leu Thr Leu Ala Leu
1               5                   10                  15

Ser Leu Leu Val Cys Leu Gly Ala Leu Ala Glu Ala Tyr Pro Ser Lys
            20                  25                  30

Pro Asp Asn Pro Gly Glu Asp Ala Pro Ala Glu Asp Met Ala Arg Tyr
        35                  40                  45

Tyr Ser Ala Leu Arg His Tyr Ile Asn Leu Ile Thr Arg Gln Arg Tyr
 50                  55                  60

Gly Lys Arg Ser Ser Pro Glu Thr Leu Ile Ser Asp Leu Leu Met Arg
65                  70                  75                  80

Glu Ser Thr Glu Asn Val Pro Arg Thr Arg Leu Glu Asp Pro Ala Met
                85                  90                  95

Trp
```

```
<210> SEQ ID NO 21
<211> LENGTH: 97
<212> TYPE: PRT
<213> ORGANISM: Artificial Sequence
<220> FEATURE:
<223> OTHER INFORMATION: Synthetic peptide

<400> SEQUENCE: 21

Met Val Phe Val Arg Arg Pro Trp Pro Ala Leu Thr Thr Val Leu Leu
1               5                   10                  15

Ala Leu Leu Val Cys Leu Gly Ala Leu Val Asp Ala Tyr Pro Ile Lys
            20                  25                  30

Pro Glu Ala Pro Gly Glu Asp Ala Ser Pro Glu Glu Leu Asn Arg Tyr
        35                  40                  45

Tyr Ala Ser Leu Arg His Tyr Leu Asn Leu Val Thr Arg Gln Arg Tyr
 50                  55                  60

Gly Lys Arg Asp Gly Pro Asp Thr Leu Leu Ser Lys Thr Phe Phe Pro
65                  70                  75                  80

Asp Gly Glu Asp Arg Pro Val Arg Ser Arg Ser Glu Gly Pro Asp Leu
                85                  90                  95

Trp
```

```
<210> SEQ ID NO 22
<211> LENGTH: 87
<212> TYPE: PRT
```

```
<213> ORGANISM: Artificial Sequence
<220> FEATURE:
<223> OTHER INFORMATION: Synthetic peptide

<400> SEQUENCE: 22

Met Lys Ile Ile Leu Trp Leu Cys Val Phe Gly Leu Phe Leu Ala Thr
1               5                   10                  15

Leu Phe Pro Ile Ser Trp Gln Met Pro Val Glu Ser Gly Leu Ser Ser
            20                  25                  30

Glu Asp Ser Ala Ser Ser Glu Ser Phe Ala Ser Lys Ile Lys Arg His
        35                  40                  45

Gly Glu Gly Thr Phe Thr Ser Asp Leu Ser Lys Gln Met Glu Glu Glu
50                  55                  60

Ala Val Arg Leu Phe Ile Glu Trp Leu Lys Asn Gly Gly Pro Ser Ser
65                  70                  75                  80

Gly Ala Pro Pro Pro Ser Gly
                85

<210> SEQ ID NO 23
<211> LENGTH: 119
<212> TYPE: PRT
<213> ORGANISM: Artificial Sequence
<220> FEATURE:
<223> OTHER INFORMATION: Synthetic peptide

<400> SEQUENCE: 23

Gly Ser Glu Val Lys Leu Gln Glu Ser Gly Pro Gly Leu Val Gln Pro
1               5                   10                  15

Ser Gln Ser Leu Ser Ile Thr Cys Thr Val Ser Gly Phe Ser Leu Ser
            20                  25                  30

Arg Tyr Gly Val His Trp Val Arg Gln Ser Pro Val Lys Gly Leu Glu
        35                  40                  45

Trp Leu Gly Val Ile Trp Ser Gly Gly Ser Thr Asp Tyr Asn Ala Ala
    50                  55                  60

Phe Ile Ser Arg Leu Ser Ile Asn Lys Asp Asn Ser Lys Ser Gln Val
65                  70                  75                  80

Phe Phe Lys Met His Ser Leu Gln Thr Tyr Asp Thr Ala Arg Tyr Tyr
                85                  90                  95

Cys Ala Arg Trp Leu Leu Pro Gly Tyr Phe Asp Val Trp Gly Ala Gly
            100                 105                 110

Thr Thr Val Thr Val Ser Ser
        115

<210> SEQ ID NO 24
<211> LENGTH: 117
<212> TYPE: PRT
<213> ORGANISM: Artificial Sequence
<220> FEATURE:
<223> OTHER INFORMATION: Synthetic peptide

<400> SEQUENCE: 24

Gln Val Gln Leu Thr Gln Ser Gly Pro Gly Leu Val Gln Pro Ser Gln
1               5                   10                  15

Ser Leu Ser Ile Thr Cys Thr Val Ser Gly Phe Ser Leu Ser Arg Tyr
            20                  25                  30

Gly Val His Trp Val Arg Gln Ser Pro Val Lys Gly Leu Glu Trp Leu
        35                  40                  45

Gly Val Ile Trp Ser Gly Gly Ser Thr Asp Tyr Asn Ala Ala Phe Ile
    50                  55                  60
```

```
Ser Arg Leu Ser Ile Asn Lys Asp Asn Ser Lys Ser Gln Val Phe Phe
 65              70                  75                  80

Lys Met His Ser Leu Gln Thr Tyr Asp Thr Ala Arg Tyr Tyr Cys Ala
             85                  90                  95

Arg Trp Leu Leu Pro Gly Tyr Phe Asp Val Trp Gly Ala Gly Thr Thr
            100                 105                 110

Val Thr Val Ser Ser
            115

<210> SEQ ID NO 25
<211> LENGTH: 112
<212> TYPE: PRT
<213> ORGANISM: Artificial Sequence
<220> FEATURE:
<223> OTHER INFORMATION: Synthetic peptide

<400> SEQUENCE: 25

Ala Val Leu Met Ser Gln Thr Pro Leu Ser Leu Pro Val Ser Leu Gly
 1               5                  10                  15

Asp Gln Ala Ser Ile Ser Cys Arg Ser Ser Gln Ser Ile Val His Ser
             20                  25                  30

Asn Gly Asn Thr Tyr Leu Glu Trp Tyr Leu Gln Lys Pro Gly Gln Ser
             35                  40                  45

Pro Lys Leu Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65              70                  75                  80

Ser Arg Val Glu Ala Glu Asp Leu Gly Ile Tyr Tyr Cys Phe Gln Gly
             85                  90                  95

Ser His Val Pro Phe Ala Phe Gly Ser Gly Thr Lys Leu Glu Ile Glu
            100                 105                 110
```

METALLOTHIONEIN ANTIBODIES AND THEIR USE

CROSS-REFERENCE

This application is a U.S. national phase of International Application No. PCT/US2020/042064, filed on Jul. 15, 2020, which claims priority to U.S. Provisional Application No. 62/874,340, filed Jul. 15, 2019, both of which are incorporated by reference herein in their entirety.

FEDERAL FUNDING STATEMENT

This invention was made with government support under Grant No. ES07408, awarded by the National Institutes of Health. The government has certain rights in the invention.

REFERENCE TO SEQUENCE LISTING

This application contains a Sequence Listing submitted as an electronic text file named "19-1213-WO-US Seq Listing_ST25.txt", having a size in bytes of 21,816 bytes in size, and created on May 29, 2025. The information contained in this electronic file is hereby incorporated by reference in its entirety pursuant to 37 CFR § 1.52 (e) (5).

BACKGROUND

Diabetes is most often treated with insulin replacement. There is research being done to replace the islets that are damaged in diabetes, but unless the inflammatory processes that damage the islet producing insulin is arrested, islet transplants or stem cell repopulation of the islets in the pancreas will be short-lived treatments. Similarly, current reagents and methods for treating hepatitis and/or inflammatory liver disease are inadequate.

SUMMARY

In one aspect, the disclosure provides isolated anti-metallothionein antibody, or fragment thereof, comprising 1, 2, or all 3, complementarity determining regions (CDRs) selected from the group consisting of:
Light chain CDR1 (L-CDR1) comprising an amino acid sequence at least 80%, 85%, 90%, 95%, or 100% identical to the amino acid sequence QSIVHSNGNTYLE (SEQ ID NO: 1);
Light chain CDR2 (L-CDR2) comprising an amino acid sequence at least 80%, 85%, 90%, 95%, or 100% identical to the amino acid sequence KVS (SEQ ID NO:2); and
Light chain CDR3 (L-CDR3) comprising an amino acid sequence at least 80%, 85%, 90%, 95%, or 100% identical to the amino acid sequence FQGSHVPF (A/T) (SEQ ID NO:3), and/or comprising 1, 2, or all 3, complementarity determining regions (CDRs) selected from the group consisting of:
Heavy chain CDR1 (H-CDR1) comprising an amino acid sequence at least 80%, 85%, 90%, 95%, or 100% identical to the amino acid sequence GFSLSRYG (SEQ ID NO:4);
Heavy chain CDR2 (H-CDR2) comprising an amino acid sequence at least 80%, 85%, 90%, 95%, or 100% identical to the amino acid sequence IWSGGST (SEQ ID NO:5); and
Heavy chain CDR3 (H-CDR3) comprising an amino acid sequence at least 80%, 85%, 90%, 95%, or 100% identical to the amino acid sequence WLLPGY (SEQ ID NO:6).

In various embodiments, the antibody comprises a monoclonal antibody, or fragment thereof, and/or a humanized antibody, or fragment thereof.

In other embodiments, the isolated anti-metallothionein antibody, or fragment thereof, comprises a light chain comprising the amino acid sequence at least 60%, 65%, 70%, 75%, 80%, 85%, 90%, 91%, 92%, 93%, 94%, 95%, 96%, 97%, 98%, 99%, or 100% identical to the amino acid sequence selected from the group consisting of SEQ ID NOS: 7-9, wherein the light chain comprises the amino acid of each of SEQ ID NOS: 1-3, and wherein the light chain comprises at least 1, 2, 3, 4, 5, 6, 7, 8, 9, 10, 11, 12, 13, 14, 15, or all 16 of the following residues: D1, V3, T5, S7, T14, Q17, P18, F41, Q42, R44, R50, V88, V90, T102, Q105, and K112; and/or comprises the amino acid sequence at least 60%, 65%, 70%, 75%, 80%, 85%, 90%, 91%, 92%, 93%, 94%, 95%, 96%, 97%, 98%, 99%, or 100% identical to the amino acid sequence selected from the group consisting of SEQ ID NOS: 11-15, wherein the heavy chain comprises the complementarity determining regions (CDRs) of each of SEQ ID NOS: 4-6, and wherein the heavy chain comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or all 43 of the following residues: E1, V5, G9, K13, G15, E16 or G16, T17, R19, L20, S21, A23, S35, 137, P40 or A40, G42, 148 or V48, S49, N58, A60, P61 or D61, S62, L63 or V63, K64, G65, V67 or F67, T68, S70, V71, T73, A74, N76 or K76, S77, F78, S79 or Y79, L80, Q81, L82, S83 or N83, V85, T86 or R86, A87, A88 or E88, V92, and Q109.

In one embodiment, the isolated anti-metallothionein antibody or fragment thereof comprises a Fab' fragment.

In other aspects, the disclosure provides nucleic acids encoding the isolated antibodies or fragment thereof, vectors comprising the nucleic acids operatively linked to a suitable control sequence, host cells comprising the nucleic acids and/or the vectors, and pharmaceutical composition, comprising
(a) the isolated antibodies or fragments thereof, the nucleic acids, the vectors, or the host cells disclosed herein; and
(b) a pharmaceutically acceptable carrier.

In another aspect, the disclosure provides methods for treating or limiting development of a disorder selected from the group consisting of intestinal inflammation, diabetes, pre-diabetes, impaired glucose tolerance, hepatitis, and/or inflammatory liver disease, comprising administering a subject in need thereof an amount effective to treat the disorder of the isolated antibody or fragment thereof or a pharmaceutically acceptable salt thereof, the nucleic acid, the vector, the host cell, or the pharmaceutical composition of any embodiment or combination of embodiments disclosed herein.

DESCRIPTION OF THE FIGURES

FIG. 1A-B. (A) Clustal Omega software comparison of humanized kappa light chains with original mouse UC1MT anti-MT L sequences. (B) Phylogram of the relative differences between the variable regions of UC1MT L-Hum1 (VK1), UC1MT L-Hum2 (VK2), and UC1MT L-Hum3 (VK3), in comparison to the sequence of the original hybridoma light chain sequence (UC1MT).

FIG. 3. ELISA measurements of humanized antibodies tested against immobilized metallothionein. Immulon 2HB plate was coated with 10 ug/mL MT overnight at 4 C, wells washed with PBST and blocked with 2% BSA for 1.5 h at RT. Plate was washed, coated with dilutions of each recombinant Fab fragment, and incubated for 1.5 h at RT. Plate was washed and incubated with 1:1000 mouse anti-human Ig light chain kappa-biotin for 1. h at RT, then washed and incubated with streptavidin-HRP (wells containing Fab) for 20 m at RT. After a final wash, substrate was added and incubated for 15 m at RT before addition of stop solution (2N $H_2SO_4$) and $OD_{450}$ measured in Spectramax plate reader. The chart represents $OD_{405}$ values. Each clone's reactivity was characterized as Low (L), Medium (M), or High (H).

DETAILED DESCRIPTION

Figure 2:
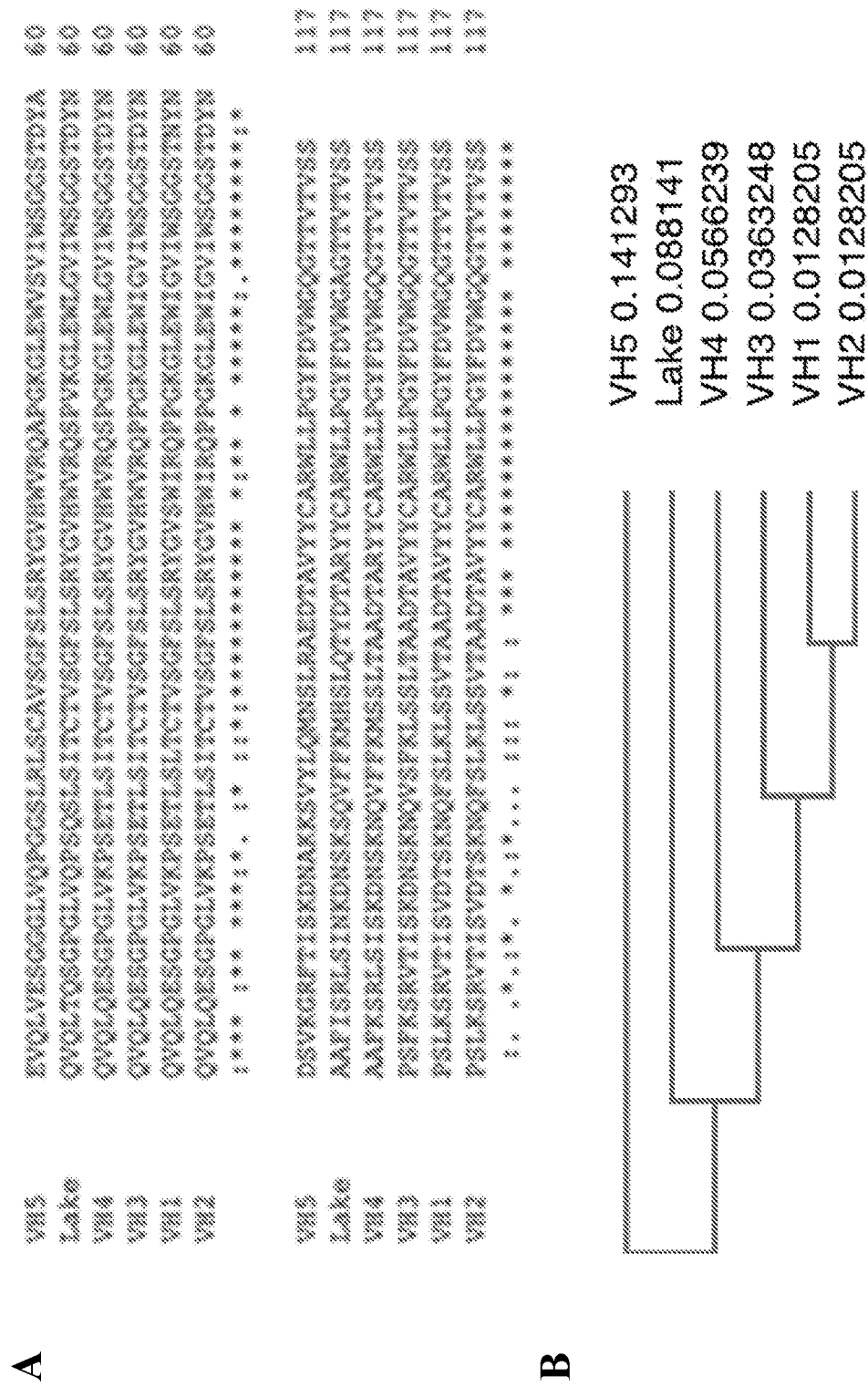
FIG. 2A-B. (A) Clustal Omega software comparison of humanized heavy chain V regions with original mouse UC1MT anti-MT H sequence. (B) Phylogram of the relative differences between the humanized variable regions of UC1MT H-Hum1 (VH1), UC1MT H-Hum2 (VH2), UC1MT H-Hum3 (VH3), UC1MT H-Hum4 (VH4), and UC1MT L-Hum5 (VH5), in comparison to the sequence of the original hybridoma heavy chain V sequence (UC1MT)

As used herein and unless otherwise indicated, the terms "a" and "an" are taken to mean "one", "at least one" or "one or more". Unless otherwise required by context, singular terms used herein shall include pluralities and plural terms shall include the singular. All embodiments of any aspect of the disclosure can be used in combination, unless the context clearly dictates otherwise.

As used herein, the amino acid residues are abbreviated as follows: alanine (Ala; A), asparagine (Asn; N), aspartic acid (Asp; D), arginine (Arg; R), cysteine (Cys; C), glutamic acid (Glu; E), glutamine (Gln; Q), glycine (Gly; G), histidine (His; H), isoleucine (Ile; I), leucine (Leu; L), lysine (Lys; K), methionine (Met; M), phenylalanine (Phe; F), proline (Pro; P), serine (Ser; S), threonine (Thr; T), tryptophan (Trp; W), tyrosine (Tyr; Y), and valine (Val; V).

In one aspect, the disclosure provides anti-metallothionein (MT) antibodies, or fragments thereof. The anti-metallothionein antibodies or fragments thereof are useful, for example, to treat disorders selected from the group consisting of intestinal inflammation, diabetes, pre-diabetes, impaired glucose tolerance, hepatitis, and/or inflammatory liver disease. The use of MT inhibitors for treating such disorders is described in WO2019/143767, incorporated by reference herein in its entirety.

As disclosed herein, "antibody" refers to immunoglobulin molecules and immunologically active portions of immunoglobulin molecules, i.e., molecules that contain an antigen binding site that immunospecifically binds an epitope in metallothionein. As such, the term antibody encompasses not only whole antibody molecules, but also antibody fragments as well as variants (including derivatives) of antibodies and antibody fragments. Such antibody or antibody fragments thereof may include, but are not limited to monoclonal antibodies, humanized antibodies, chimeric antibodies, Fab', F(ab')$_2$, Fab, Fv, rIgG, recombinant single chain Fv fragments (scFv), bivalent or bispecific molecules, diabodies, triabodies, and tetrabodies. In one specific embodiment, the antibodies comprise monoclonal antibodies, or fragments thereof. In a further specific embodiment, the antibodies comprise humanized antibodies, or fragments thereof. In one embodiment, the antibodies comprise Fab' fragments.

In one embodiment, the antibodies are humanized. As used herein, the term "humanized antibody" refers to a chimeric antibody which contain minimal sequence derived from non-human immunoglobulin. In one embodiment, a humanized antibody is a human immunoglobulin (recipient antibody) in which residues from a CDR of the recipient are replaced by residues from a CDR of a non-human species (donor antibody) such as mouse, rat, rabbit or non-human primate having the desired specificity, affinity, and/or capacity. In some instances, framework ("FR") residues of the human immunoglobulin are replaced by corresponding non-human residues. Furthermore, humanized antibodies may comprise residues that are not found in the recipient antibody or in the donor antibody. These modifications may be made to further refine antibody performance, such as binding affinity, expression, and reduction in the immunogenicity of a xenogenic antibody, such as a murine antibody, for introduction into a human, while maintaining the full antigen binding affinity and specificity of the antibody.

As used herein, "isolated" means that the indicated molecule is present in the substantial absence of other biological macromolecules of the same type.

In one embodiment, humanized antibodies or fragments thereof are provided, comprising 1, 2, or all 3, complementarity determining regions (CDRs) selected from the group consisting of:

Light chain CDR1 (L-CDR1) comprising an amino acid sequence at least 80%, 85%, 90%, 95%, or 100% identical to the amino acid sequence QSIVHSNGNTYLE (SEQ ID NO: 1);

Light chain CDR2 (L-CDR2) comprising an amino acid sequence at least 80%, 85%, 90%, 95%, or 100% identical to the amino acid sequence KVS (SEQ ID NO:2); and Light chain CDR3 (L-CDR3) comprising an amino acid sequence at least 80%, 85%, 90%, 95%, or 100% identical to the amino acid sequence FQGSHVPF (A/T) (SEQ ID NO:3).

In another embodiment, humanized anti-metallothionein antibodies or fragment thereof, are provided comprising 1, 2, or all 3 complementarity determining regions (CDRs) selected from the group consisting of:

Heavy chain CDR1 (H-CDR1) comprising an amino acid sequence at least 80%, 85%, 90%, 95%, or 100% identical to the amino acid sequence GFSLSRYG (SEQ ID NO:4);

Heavy chain CDR2 (H-CDR2) comprising an amino acid sequence at least 80%, 85%, 90%, 95%, or 100% identical to the amino acid sequence IWSGGST (SEQ ID NO:5); and Heavy chain CDR3 (H-CDR3) comprising an amino acid sequence at least 80%, 85%, 90%, 95%, or 100% identical to the amino acid sequence WLLPGY (SEQ ID NO:6).

In a further embodiment, the humanized anti-metallothionein antibody of claim 1, or fragment thereof, comprising 4, 5, or all 6 complementarity determining regions (CDRs) selected from the group consisting of:

Heavy chain CDR1 (H-CDR1) comprising an amino acid sequence at least 80%, 85%, 90%, 95%, or 100% identical to the amino acid sequence GFSLSRYG (SEQ ID NO:4);

Heavy chain CDR2 (H-CDR2) comprising an amino acid sequence at least 80%, 85%, 90%, 95%, or 100% identical to the amino acid sequence IWSGGST (SEQ ID NO:5); and Heavy chain CDR3 (H-CDR3) comprising an amino acid sequence at least 80%, 85%, 90%, 95%, or 100% identical to the amino acid sequence WLLPGY (SEQ ID NO:6);

Light chain CDR1 (L-CDR1) comprising an amino acid sequence at least 80%, 85%, 90%, 95%, or 100% identical to the amino acid sequence QSIVHSNGNTYLE (SEQ ID NO: 1);

Light chain CDR2 (L-CDR2) comprising an amino acid sequence at least 80%, 85%, 90%, 95%, or 100% identical to the amino acid sequence KVS (SEQ ID NO:2); and Light chain CDR3 (L-CDR3) comprising an amino acid sequence at least 80%, 85%, 90%, 95%, or 100% identical to the amino acid sequence FQGSHVPF (A/T) (SEQ ID NO:3).

In another aspect, isolated anti-metallothionein antibodies, or fragments thereof, are provided that comprise a light chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence selected from the group consisting of SEQ ID NOS: 7-9, as shown in Table 1 (see also FIG. 1), wherein the light chain comprises the complementarity determining regions (CDRs) of each SEQ ID NOS: 1-3, and wherein the light chain comprises at least 1, 2, 3, 4, 5, 6, 7, 8, 9, 10, 11, 12, 13, 14, 15, or all 16 of the following residues (noted in bold and enlarged font in Table 1): D1, V3, T5, S7, T14, Q17, P18, F41, Q42, R44, R50, V88, V90, T102, Q105, and K112.

TABLE 1

DVVMTQSPLSLPVTLGQPASISCRSSQSIVHSNGNTYLEWFQQRPGQSPR
LLIYKVSNRFSGVPDRFSGSGSGTDETLKISRVEAEDVGVYYCFQGSHVP
FTFGQGTKLEIK UC1MT-L-Hum1 SEQ ID NO: 7

DVVMTQSPLSLPVTLGQPASISCRSSQSIVHSNGNTYLEWYLQRPGQSPR
LLIYKVSNRFSGVPDRFSGSGSGTDFTLKISRVEAEDVGVYYCFQGSHVP
FAFGQGTKLEIK UC1MT-L-Hum2 SEQ ID NO: 8

DVVMTQSPLSLPVTLGQPASISCRSSQSIVHSNGNTYLEWYLQRPGQSPR
LLIYKVSNRFSGVPDRFSGSGSGTDFTLKISRVEAEDLGIYYCFQGSHVP
FAFGQGTKLEIK UC1MT-L-Hum3 SEQ ID NO: 9

The bolded letters represent changes relative to the parental mouse hybridoma; the CDRs are underlined.

In one specific embodiment, the isolated anti-metallothionein antibody, or fragment thereof, comprises a light chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence of SEQ ID NO:8, wherein the light chain comprises the CDRs of each of SEQ ID NOS: 1-3, and wherein the light chain comprises at least 1, 2, 3, 4, 5, 6, 7, 8, 9, 10, 11, 12, or all 13 of the following residues (noted in bold and enlarged font in Table 1): D1, V3, T5, S7, T14, Q17, P18, R44, R50, V88, V90, Q105, and K112.

In another embodiment, the light chain of the isolated anti-metallothionein antibody, or fragment thereof further comprises a kappa constant region from a human light chain, including but not limited to an amino acid sequence at least 60%, 65%, 70%, 75%, 80%, 85%, 90%, 91%, 92%, 93%, 94%, 95%, 96%, 97%, 98%, 99%, or 100% identical to the amino acid sequence of:

(SEQ ID NO: 10)
RTVAAPSVFIFPPSDEQLKSGTASVVCLLNNFYPREAKVQWKVDNALQSG

NSQESVTEQDSKDSTYSLSSTLTLSKADYEKHKVYACEVTHQGLSSPVTK

SFNRGEC

In another aspect are provided isolated anti-metallothionein antibodies, or fragments thereof, comprising a heavy chain comprising an amino acid sequence at least 60%, 65%, 70%, 75%, 80%, 85%, 90%, 91%, 92%, 93%, 94%, 95%, 96%, 97%, 98%, 99%, or 100% identical to the amino acid sequence selected from the group consisting of SEQ ID NOS: 11-15, wherein the heavy chain comprises the complementarity determining regions (CDRs) of each of SEQ ID NOS: 4-6, and wherein the heavy chain comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or all 43 of the following residues (noted in bold and enlarged font in Table 2; see also FIG. 2): E1, V5, G9, K13, G15, E16 or G16, T17, R19, L20, S21, A23, S35, I37, P40 or A40, G42, I48 or V48, S49, N58, A60, P61 or D61, S62, L63 or V63, K64, G65, V67 or F67, T68, S70, V71, T73, A74, N76 or K76, S77, F78, S79 or Y79, L80, Q81, L82, S83 or N83, V85, T86 or R86, A87, A88 or E88, V92, and Q109.

In the sequences that follow, the bolded letters represent changes relative to the parental UC1MT mouse hybridoma sequence; the CDRs are underlined.

TABLE 2

QVQLQESGPGLVKPSETLSLTCTVSGFSLSRYGVSWIRQPPGKGLEWIGV
IWSGGSTNYNPSLKSRVTISVDTSKNQFSLKLSSVTAADTAVYYCARWLL
PGYFDVWGQGTTVTVSS UC1MT-H-Hum1 (SEQ ID NO: 11)

QVQLOESGPGLVKPSETLSITCTVSGFSLSRYGVHWIRQPPGKGLEWIGV
IWSGGSTDYNPSLKSRVTISVDTSKNQFSLKLSSVTAADTAVYYCARWLL
PGYFDVWGQGTTVTVSS UC1MT-H-Hum2 (SEQ ID NO: 12)

QVQLQESGPGLVKPSETLSITCTVSGFSLSRYGVHWVRQPPGKGLEWIGV
IWSGGSTDYNPSFKSRVTISKDNSKNQVSFKLSSLTAADTAVYYCARWLL
PGYFDVWGQGTTVTVSS UC1MT-H-Hum3 (SEQ ID NO: 13)

QVQLQESGPGLVKPSETLSITCTVSGFSLSRYGVHWVRQSPGKGLEWLGV
IWSGGSTDYNAAFKSRLSISKDNSKNQVFFKMSSLTAADTARYYCARWLL
PGYFDVWGQGTTVTVSS UC1MT-H-Hum4 (SEQ ID NO: 14)

EVQLVESGGGLVQPGGSLRLSCAVSGFSLSRYGVHWVRQAPGKGLEWVSV
IWSGGSTDYADSVKGRFTISKDNAKKSVYLQMNSLRAEDTAVYYCARWLL
PGYFDVWGQGTTVTVSS UC1MT-H-Hum5 (SEQ ID NO: 15)

In one specific embodiment, the isolated anti-metallothionein antibody, or fragment thereof, comprises a heavy chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid of SEQ ID NOS: 14, wherein the heavy chain comprises the complementarity determining regions (CDRs) of each of SEQ ID NOS: 4-6, and wherein the heavy chain comprises at least 1, 2, 3, 4, 5, 6, 7, 8, 9, 10, 11, 12, or all 13 of the following residues (noted in bold and enlarged font in Table 2; see also FIG. 2): K13, E16, V37, G42, K64, S70, N76, V78, S83, T86, A87, A88, and Q109.

In another specific embodiment, the isolated anti-metallothionein antibody, or fragment thereof, comprises a heavy chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence of SEQ ID NOS: 15, wherein the heavy chain comprises the complementarity determining regions (CDRs)

of each of SEQ ID NOS: 4-6, and wherein the heavy chain comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or all 34 of the following residues (noted in bold and enlarged font in Table 2; see also FIG. 2): E1, V5, G9, G15, G16, R19, L20, S21, A23, A40, G42, V48, S49, A60, D61, S62, V63, K64, G65, F67, T68, A74, K76, S77, V78, Y79, L80, Q81, N83, R86, A87, E88, V92, and Q109.

In another embodiment, the heavy chain further comprises a human IgG1 constant sequence that includes a mutation that prevents glycosylation, including but not limited to the amino acid sequence at least 60%, 65%, 70%, 75%, 80%, 85%, 90%, 91%, 92%, 93%, 94%, 95%, 96%, 97%, 98%, 99%, or 100% identical to the amino acid sequence of SEQ ID NO:27.

```
                                             (SEQ ID NO: 16)
astkgpsvfp lapsskstsg gtaalgclvk dyfpepvtvs wnsgaltsgv htfpavlqss glyslssvvt vpssslgtqt yicnvnhkps ntkvdkkvep kscdkthtcp pcpapellgg psvflfppkp kdtlmisrtp evtcvvvdvs hedpevkfnw yvdgvevhna ktkpreeqyQ styrvvsvlt vlhqdwlngk eykckvsnka lpapiektis kakgqprepq vyclppsrde ltknqvslcc lvkgfypsdi avewesngqp ennykttppv ldsdgsffly skltvdksrw gqgnvfscsv mhealhnhyt qkslslspgk
```

In a further embodiment, the isolated anti-metallothionein antibody, or fragment thereof, comprises:
(a) a light chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence selected from the group consisting of SEQ ID NOS: 7-9, wherein the light chain comprises the complementarity determining regions (CDRs) of each SEQ ID NOS: 1-3, and wherein the light chain comprises at least 1, 2, 3, 4, 5, 6, 7, 8, 9, 10, 11, 12, 13, 14, 15, or all 16 of the following residues: D1, V3, T5, S7, T14, Q17, P18, F41, Q42, R44, R50, V88, V90, T102, Q105, and K112; and
(b) comprises a heavy chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence selected from the group consisting of SEQ ID NOS: 16-26, or selected from the group consisting of SEQ ID NOS: 11-15, wherein the heavy chain comprises the complementarity determining regions (CDRs) of each of SEQ ID NOS: 4-6, and wherein the heavy chain comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or all 43 of the following residues (noted in bold and enlarged font in Table 2; see also FIG. 2): E1, V5, G9, K13, G15, E16 or G16, T17, R19, L20, S21, A23, S35, I37, P40 or A40, G42, I48 or V48, S49, N58, A60, P61 or D61, S62, L63 or V63, K64, G65, V67 or F67, T68, S70, V71, T73, A74, N76 or K76, S77, F78, S79 or Y79, L80, Q81, L82, S83 or N83, V85, T86 or R86, A87, A88 or E88, V92, and Q109.

In another specific embodiment, the isolated anti-metallothionein antibody, or fragment thereof, comprises (a) a light chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence of SEQ ID NO:8, wherein the light chain comprises the CDRs of each of SEQ ID NOS: 1-3, and wherein the light chain comprises at least 1, 2, 3, 4, 5, 6, 7, 8, 9, 10, 11, 12, or all 13 of the following residues (noted in bold and enlarged font in Table 1): D1, V3, T5, S7, T14, Q17, P18, R44, R50, V88, V90, Q105, and K112; and
(b) comprises a heavy chain comprising an amino acid sequence at least 60%, 65%, 70%, 75%, 80%, 85%, 90%, 91%, 92%, 93%, 94%, 95%, 96%, 97%, 98%, 99%, or 100% identical the amino acid sequence selected from the group consisting of SEQ ID NOS: 14-15, wherein the heavy chain comprises the complementarity determining regions (CDRs) of each of SEQ ID NOS: 4-6, and wherein the heavy chain comprises
  (i) 1, 2, 3, 4, 5, 6, 7, 8, 9, 10, 11, 12, or all 13 of the following residues: K13, E16, V37, G42, K64, S70, N76, V78, S83, T86, A87, A88, and Q109; or
  (ii) 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or all 34 of the following residues (noted in bold and enlarged font in Table 2; see also FIG. 2): E1, V5, G9, G15, G16, R19, L20, S21, A23, A40, G42, V48, S49, A60, D61, S62, V63, K64, G65, F67, T68, A74, K76, S77, V78, Y79, L80, Q81, N83, R86, A87, E88, V92, and Q109.

The anti-MT antibodies of the disclosure may be linked to any other moiety as deemed suitable for an intended purpose. In one embodiment, the isolated antibody or fragment thereof further comprises a detectable label. Such embodiments may be useful for monitoring a course of treatment, for example. Any suitable detectable label may be bound, either covalently, genetically, or by any other means, to the antibody, including but not limited to radioactive isotopes, fluorescent molecules, magnetic particles (including nanoparticles), metal particles (including nanoparticles), phosphorescent molecules, and enzymes.

In another embodiment, the isolated antibody or fragment thereof further comprises an additional therapeutic agent. Any therapeutic agent suitable for an intended purpose may be linked either covalently, genetically, or by any other means, to the antibody, including but not limited to insulin, metformin, pramlintide, a sulfonylurea (including but not limited to glyburide, glipizide, and glimepiride), a meglitinide (including but not limited to repaglinide and nateglinide), a thiazolidinedione (including but not limited to rosiglitazone and pioglitazone), a DPP-4 inhibitor (including but not limited to sitagliptin, saxagliptin, and linagliptin), a GLP-1 receptor agonist (including but not limited to exenatide, liraglutide, and semaglutide), a SGLT2 inhibitor (including but not limited to canagliflozin, dapagliflozin, and empagliflozin), entecavir, tenofovir, lamivudine, adefovir, telbivudine, simeprevir, sofosbuvir, cytokines, chemokines, interferon or ribavirin. Such conjugates may be useful, for example, in the methods disclosed herein.

In another embodiment, the isolated antibody or fragment thereof further comprises a cell targeting moiety. Any cell targeting moiety may be used as deemed suitable for an intended cell target, including but not limited to a pancreatic or hepatic cell targeting moiety (such as a pancreatic cell targeting moiety comprising one or more peptides or other moieties that preferentially bind pancreatic β cells, including but not limited to glucagon-like peptide-1 (GLP-1), glucagon-like peptide-2 (GLP-2), peptide YY (PYY), neuropeptide Y (NPY), pancreatic peptide (PPY), and exendin-4; or a hepatic cell targeting moiety, and wherein the hepatic cell targeting moiety includes but is not limited to circumsporozoite protein (CSP), CSP region I, CSP I plus, lactosaminated human serum albumin, glycosylated lipoprotein, and arabinogalactan). Such conjugates may be useful, for example, in the methods disclosed herein.

In another aspect isolated nucleic acids are disclosed encoding the antibody of any embodiment or combination of embodiments disclosed herein. The isolated nucleic acid sequence may comprise RNA or DNA. Such isolated nucleic acid sequences may comprise additional sequences useful for promoting expression and/or purification of the encoded protein, including but not limited to polyA sequences, modified Kozak sequences, and sequences encoding epitope tags, export signals, and secretory signals, nuclear localization signals, and plasma membrane localization signals.

In a further aspect expression vectors comprising the isolated nucleic acid of the disclosure are provided. "Expression vectors" include vectors that operatively link a nucleic acid coding region or gene to any promoter capable of effecting expression of the gene product. The promoter sequence used to drive expression of the disclosed nucleic acid sequences in a mammalian system may be constitutive (driven by any of a variety of promoters, including but not limited to, CMV, SV40, RSV, actin, EF) or inducible (driven by any of a number of inducible promoters including, but not limited to, tetracycline, ecdysone, steroid-responsive). The expression vector is replicable in a suitable host organism either as an episome or by integration into host chromosomal DNA. In various embodiments, the expression vector comprises a plasmid or viral vector.

In a further aspect, host cells comprising the antibody, nucleic acid, and/or vector of the disclosure are provided. The host cells can be either prokaryotic or eukaryotic. The cells can be transiently or stably transfected. In one embodiment, the cells are hybridoma cells that express and secrete antibodies of the present disclosure. Thus, the recombinant host cells can be used, for example in methods for producing antibody, comprising:

(a) culturing the recombinant host cell under conditions suitable for expression of the nucleic-acid encoded antibody; and
(b) isolating the antibody from the cultured cells.

Suitable conditions for expression of the nucleic-acid encoded antibody can be determined by those of skill in the art based on the teachings herein, the specific host cells and vectors used, and the general knowledge of those of skill in the art.

In another aspect pharmaceutical compositions are provided, comprising:

(a) the antibody, isolated nucleic acid, expression vector, or host cell of any embodiment or combination of embodiments disclosed herein; and
(b) a pharmaceutically acceptable carrier.

For example, the antibodies of the disclosure may be present in a pharmaceutical formulation. In this embodiment, the antibodies are combined with a pharmaceutically acceptable carrier. Suitable acids which are capable of forming such salts include inorganic acids such as hydrochloric acid, hydrobromic acid, perchloric acid, nitric acid, thiocyanic acid, sulfuric acid, phosphoric acid and the like; and organic acids such as formic acid, acetic acid, propionic acid, glycolic acid, lactic acid, pyruvic acid, oxalic acid, malonic acid, succinic acid, maleic acid, fumaric acid, anthranilic acid, cinnamic acid, naphthalene sulfonic acid, sulfanilic acid and the like. Suitable bases capable of forming such salts include inorganic bases such as sodium hydroxide, ammonium hydroxide, potassium hydroxide and the like; and organic bases such as mono-, di- and tri-alkyl and aryl amines (e.g., triethylamine, diisopropyl amine, methyl amine, dimethyl amine and the like) and optionally substituted ethanol-amines (e.g., ethanolamine, diethanolamine and the like).

The pharmaceutical composition may comprise in addition to the composition of the invention (a) a lyoprotectant; (b) a surfactant; (c) a bulking agent; (d) a tonicity adjusting agent; (e) a stabilizer; (f) a preservative and/or (g) a buffer. In some embodiments, the buffer in the pharmaceutical composition is a Tris buffer, a histidine buffer, a phosphate buffer, a citrate buffer or an acetate buffer. The pharmaceutical composition may also include a lyoprotectant, e.g. sucrose, sorbitol or trehalose. In certain embodiments, the pharmaceutical composition includes a preservative e.g. benzalkonium chloride, benzethonium, chlorohexidine, phenol, m-cresol, benzyl alcohol, methylparaben, propylparaben, chlorobutanol, o-cresol, p-cresol, chlorocresol, phenylmercuric nitrate, thimerosal, benzoic acid, and various mixtures thereof. In other embodiments, the pharmaceutical composition includes a bulking agent, like glycine. In yet other embodiments, the pharmaceutical composition includes a surfactant e.g., polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste, or a combination thereof. The pharmaceutical composition may also include a tonicity adjusting agent, e.g., a compound that renders the formulation substantially isotonic or isoosmotic with human blood. Exemplary tonicity adjusting agents include sucrose, sorbitol, glycine, methionine, mannitol, dextrose, inositol, sodium chloride, arginine and arginine hydrochloride. In other embodiments, the pharmaceutical composition additionally includes a stabilizer, e.g., a molecule which, when combined with a protein of interest substantially prevents or reduces chemical and/or physical instability of the protein of interest in lyophilized or liquid form. Exemplary stabilizers include sucrose, sorbitol, glycine, inositol, sodium chloride, methionine, arginine, and arginine hydrochloride.

The pharmaceutical compositions of the invention may be made up in any suitable formulation, preferably in formulations suitable for administration by injection. Such pharmaceutical compositions can be used, for example, in the therapeutic methods disclosed herein.

The pharmaceutical compositions may contain any other components as deemed appropriate for a given use, such as additional therapeutics. In one embodiment, the pharmaceutical compositions further comprise an additional therapeutic selected from the group consisting of insulin, metformin, pramlintide, a sulfonylurea (including but not limited to glyburide, glipizide, and glimepiride), a meglitinide (including but not limited to repaglinide and nateglinide), a thiazolidinedione (including but not limited to rosiglitazone and pioglitazone), a DPP-4 inhibitor (including but not limited to sitagliptin, saxagliptin, and linagliptin), a GLP-1 receptor agonist (including but not limited to exenatide, liraglutide, and semaglutide), a SGLT2 inhibitor (including but not limited to canagliflozin, dapagliflozin, and empagliflozin), entecavir, tenofovir, lamivudine, adefovir, telbivudine, simeprevir, sofosbuvir, cytokines, chemokines, interferon or ribavirin.

In another aspect, the disclosure provides methods for treating or limiting development of a disorder selected from the group consisting of intestinal inflammation, diabetes, pre-diabetes, impaired glucose tolerance, hepatitis, and/or inflammatory liver disease, comprising administering a subject in need thereof an amount effective to treat the disorder of the isolated antibody or fragment thereof, the nucleic acid, the vector, the host cell, and/or the pharmaceutical composition of any embodiment or combination of embodiments disclosed herein.

As used herein, a "therapeutically effective amount" refers to an amount of the composition that is effective for treating and/or limiting the relevant disorder.

As used herein, "treat" or "treating" means accomplishing one or more of the following in an individual that has one or more of the recited disorders: (a) reducing the severity of the disorder; (b) limiting or preventing development of symptoms characteristic of the disorder(s) being treated; (c) inhibiting worsening of symptoms characteristic of the disorder(s) being treated; (d) limiting or preventing recurrence of the disorder(s) in patients that have previously had the disorder(s); and/or (e) limiting or preventing recurrence of symptoms in patients that were previously symptomatic for the disorder(s). Any amount of such "treating" is of great benefit to a subject one of the recited disorders.

As used herein, "limit" or "limiting development of" means accomplishing one or more of the following in an individual that is at risk one or more of the recited disorders: (a) slowing progression to the disorder and/or (b) limiting or preventing development of symptoms characteristic of progression to the disorder. Any amount of such "limiting development" is of great benefit to a subject at risk of one of the recited disorders.

Such treating or limiting development of may comprise use of the extracellular MT inhibitor as the sole therapeutic, or may comprise its use to complement or augment other therapeutic interventions, as deemed appropriate by attending medical personnel.

In one embodiment, the subject has diabetes or is at risk of developing diabetes, and the method serves to treat or limit development of diabetes.

In one such embodiment, the subject is at risk of type 1 diabetes, and the method serves to limit development of type I diabetes in the subject. As described in WO2019/143767, human MT1 inhibitors prevented development of type 1 diabetes in the NOD mouse model. Thus, the methods of this embodiment can be used to limit development of type 1 diabetes (TID) in subjects at risk of TID. Limiting development of TID may include, but is not limited to, slowing progression to TID and/or slowing development of symptoms characteristic of TID. In this embodiment, the subject at risk for TID has one or more risk factor for TID from which attending medical personnel deems the treatment to be appropriate. Such risk TID risk factors include, but are not limited to: a parent or sibling with type 1 diabetes, a pancreatic tumor, pancreatitis, pancreatic islet cell autoantibodies, insulin autoantibodies, glutamic acid decarboxylase autoantibodies (GADA), insulinoma-associated (IA-2) autoantibodies, zinc transporter autoantibodies (ZnT8), and/or variants of the IDDM1 gene selected from the group consisting of DRB1 0401, DRB1 0402, DRB1 0405, DQA 0301, DQB1 0302 and DQB1 0201. Alternatively, or in combination, the subject may exhibit one or more symptom of TID (but not yet be diagnosed with TID); such symptoms may include, but are not limited to polyuria (increased urination), polydipsia (increased thirst), dry mouth, polyphagia (increased hunger), fatigue, and weight loss. As will be understood by those of skill in the art, any limit on the development of TID or its symptoms provides a great benefit a subject at risk The Insulin-dependent (type I) diabetes mellitus 1 (IDDM1) gene is located in the MHC Class II region on chromosome 6. Certain variants of this gene increase the risk for decreased histocompatibility characteristic of type 1 diabetes. Such variants include DRB1 0401, DRB1 0402, DRB1 0405, DQA 0301, DQB1 0302 and DQB1 0201. Similarly, the appearance of diabetes-related autoantibodies such as pancreatic islet cell autoantibodies, insulin autoantibodies, glutamic acid decarboxylase autoantibodies (GADA), insulinoma-associated (IA-2) autoantibodies, zinc transporter autoantibodies (ZnT8) often predate the hyperglycemia diabetes type 1 before any hyperglycemia arises. The risk of TID increases with the number of antibody types, and the time interval from emergence of autoantibodies to clinically diagnosable TID can be a few months in infants and young children, but in some people it may take years. Such autoantibodies can be detected by, for example, immunofluorescence or binding assays.

In another embodiment, the subject has type 1 diabetes, and the method serves to treat type I diabetes in the subject. In this embodiment, the subject has already been diagnosed with TID, and the methods can be used to treat TID. TID involves autoimmune destruction of beta cells in the pancreas, little to no insulin production, and hyperglycemia. Treating TID thus involves administration of insulin to the subject. Subjects with TID may have symptoms or complications including but not limited to hypoglycemia, polyuria, polyphagia, polydipsia, weight loss, blurred vision, fatigue, decreased wound healing capability, urinary tract infections, sexual dysfunction, dry mouth, diabetic ketoacidosis, cardiovascular disease, diabetic nephropathy, diabetic neuropathy, diabetic retinopathy, stroke, kidney failure, and foot ulcers. In some cases, a subject having TID may require a pancreatic or pancreatic islet transplant. Thus, in various embodiments, the treating may comprise one or more of: reducing frequency of need for insulin injection; slowing development or progression of type 1 diabetes complications in the subject including but not limited to destruction of pancreatic beta cells, hyperglycemia, hypoglycemia, polyuria, polyphagia, polydipsia, weight loss, blurred vision, fatigue, decreased wound healing capability, urinary tract infections, sexual dysfunction, dry mouth, diabetic ketoacidosis, cardiovascular disease, diabetic nephropathy, diabetic neuropathy, diabetic retinopathy, stroke, kidney failure, and foot ulcers; and delaying need for a pancreatic or pancreatic islet cell transplant. In one embodiment, the treating may comprise a reduction of 10%, 15%, 20% or greater in blood glucose levels (mg/dL), such as, for example, within 20-120 minutes after administration of the inhibitor.

In another embodiment, the subject is at risk of type 2 diabetes, and the method serves to limit development of type 2 diabetes (T2D) in the subject. T2D is a metabolic disorder characterized by hyperglycemia, insulin resistance, and relative lack of insulin. Symptoms and/or complications include, but are not limited to, hypoglycemia, insulin resistance, diabetic nephropathy, diabetic neuropathy, diabetic retinopathy, proteinuria, impaired glomerular clearance, diabetic circulatory disorders, kidney failure, cardiovascular disease, polyuria, polydipsia, weight loss, and stroke. In one embodiment, the limiting development of type 2 diabetes may comprise a reduction of 10%, 15%, 20% or greater in blood glucose levels (mg/dL), such as, for example, within 20-120 minutes after administration of the inhibitor.

Risk factors for T2D include, but are not limited to, obesity, smoking, a sedentary lifestyle, a parent or sibling with type 2 diabetes, pre-diabetes, a parent or sibling with pre-diabetes, poor eating habits (ex: too much fat, not enough fiber, too many simple carbohydrates, etc.), age 50 or older, high blood pressure, high cholesterol, testosterone deficiency, metallothionein 1 A (MT1A) rs8052394 locus (G alteration) single nucleotide polymorphism, and a history of gestational diabetes. Thus, in various embodiments the subject has one or more of these risk factors, and the method serves to slow progression to T2D and/or (b) limit or prevent development of symptoms characteristic of T2D.

In another embodiment, the subject has T2D, and the method serves to treat T2D in the subject. In this embodiment, the treating may comprise limiting one or more of type 2 diabetic complications, including but not limited to hyperglycemia, hypoglycemia, insulin resistance, diabetic nephropathy, diabetic neuropathy, diabetic retinopathy, proteinuria, impaired glomerular clearance, diabetic circulatory disorders, kidney failure, cardiovascular disease, polyuria, polydipsia, weight loss, stroke, and reducing frequency of need for insulin or other therapy. Any amount of limiting of these symptoms/complications is of great benefit to a subject with T2D. In one embodiment, the treating may comprise a reduction of 10%, 15%, 20% or greater in blood glucose levels (mg/dL), such as, for example, within 20-120 minutes after administration of the inhibitor.

In another embodiment, the subject has pre-diabetes, and the method serves to treat pre-diabetes in the subject. In this embodiment, the subject is one who has pre-diabetes. As used herein, "pre-diabetes" is the state in which some but not all of the diagnostic criteria for diabetes are met. Thus, the prediabetic subject may: (a) have impaired fasting glucose tolerance, which is a condition whereby the response of beta cells to an oral glucose challenge (OGT) is deficient or (b) may have consistently elevated fasting glucose (IFG), which is a condition in which the fasting blood glucose is elevated above what is considered normal levels but is not high enough to be classified as diabetes mellitus. The pre-diabetic state may be associated with insulin resistance and increased risk of cardiovascular pathology. Individuals with a pre-diabetic state are at a relatively high risk of developing T2D. The methods of the disclosure can be used to treat a subject with pre-diabetes by, for example, limiting or slowing progression of one or more complications of pre-diabetes, including but not limited to T2D, hyperglycemia, insulin resistance, and/or cardiovascular disease. In one embodiment, the treating may comprise a reduction of 10%, 15%, 20% or greater in blood glucose levels (mg/dL), such as, for example, within 20-120 minutes after administration of the inhibitor.

In another embodiment, the subject has impaired glucose intolerance, and the method serves to treat impaired glucose tolerance in the subject. As used herein, impaired glucose tolerance is defined as two-hour glucose levels of 140 to 199 mg per dL (7.8 to 11.0 mmol/l) on the 75-g oral glucose tolerance test. A patient is said to be under the condition of IGT when he/she has an intermediately raised glucose level after 2 hours, but less than the level that would qualify for type 2 diabetes mellitus. The fasting glucose may be either normal or mildly elevated. Impaired glucose tolerance is a pre-diabetic state of hyperglycemia that is associated with insulin resistance and increased risk of cardiovascular pathology. IGT may precede type 2 diabetes mellitus by many years. In this embodiment, the treating may comprise limiting or slowing progression of one or more complications of impaired glucose tolerance, including but not limited to type 2 diabetes, hyperglycemia, insulin resistance, and/or cardiovascular disease. In one embodiment, the treating may comprise a reduction of 10%, 15%, 20% or greater in blood glucose levels (mg/dL), such as, for example, within 20-120 minutes after administration of the inhibitor.

In another embodiment, the subject has hepatitis, and the method serves to treat hepatitis in the subject. As described in WO2019/143767, MT inhibitors are effective in limiting tissue inflammation, and decreased pro-inflammatory cytokines MCP-1 and TNF-a while increasing the anti-inflammatory IL-10 signal in liver tissue. Hepatitis is an inflammation of the liver tissue. Symptoms include, but are not limited to yellow discoloration of the skin and whites of the eyes, poor appetite, vomiting, tiredness, abdominal pain, diarrhea, acute liver failure, scarring of the liver, liver failure, or liver cancer. The most common causes of hepatitis are viral infections (types A, B, C, D, and E), heavy alcohol use, certain medications, toxins, other infections, autoimmune diseases, and non-alcoholic steatohepatitis (NASH). Thus, in various embodiments the treating may comprise limiting or slowing progression of one or more complications of hepatitis, including but not limited to yellow discoloration of the skin and/or whites of the eyes, poor appetite, vomiting, fatigue, abdominal pain, diarrhea, acute liver failure, scarring of the liver, liver failure, and liver cancer.

In a further embodiment, the subject has an inflammatory liver disease, and the method serves to treat the inflammatory liver disease in the subject. As used herein, "Inflammatory liver disease" is a condition associated with intracytoplasmic accumulation of large vacuoles of triglyceride fat in liver cells via steatosis (i.e., abnormal retention of lipids within a cell). The liver plays a large role in systemic metabolism and energy imbalance is particularly associated with defects in liver lipid metabolism. Specifically, obesity and insulin resistance are often associated by increased lipid deposition in the liver characteristic of nonalcoholic fatty liver disease (NAFLD). Although lipid metabolism is highly dynamic, chronic lipid overload causes tissue damage in the liver resulting in recruitment of liver-resident and non-resident immune cells which can cause fibrosis characteristic of nonalcoholic steatohepatitis (NASH). Liver fibrosis can lead to cirrhosis, cancer and significantly increases the risk of cardiovascular disease. This raises the potential for blocking recruitment of immune cells to the liver to ameliorate the risks of non-alcoholic fatty liver disease (NAFLD). As shown in the examples that follow, MT inhibitor treatment was responsible for an increase in the wet tissue weight of epididimal white adipose tissue, and decreased total triglyceride levels, as well as decreased pro-inflammatory cytokines MCP-1 and TNF-a while increasing the anti-inflammatory IL-10 signal. The inflammatory liver disease may be steatosis (non-alcoholic fatty liver (NAFL)). In another embodiment, fatty liver disease may non-alcoholic fatty liver disease (NAFLD), including but not limited to non-alcoholic steatohepatitis (NASH), the most extreme form of NAFLD. NAFLD is one of the types of inflammatory liver disease which occurs when fat is deposited (steatosis) in the liver due to causes other than excessive alcohol use. Symptoms of NASH and NAFLD may include, but are not limited to, fatigue, malaise, dull right-upper-quadrant abdominal discomfort, mild jaundice, and abnormal liver function tests during routine blood tests; complications of NASH and NAFLD may include, but are not limited to hepatic fibrosis, hepatic cancer, and/or cirrhosis of the liver. Thus, in one embodiment, the inflammatory liver disease is selected from the group consisting of nonalcoholic steatohepatitis (NASH)

and/or non-alcoholic fatty liver disease (NAFLD). In a further embodiment, the treating comprises limiting or slowing progression of one or more complications of inflammatory liver disease including but not limited to fatigue, malaise, hepatic fibrosis, hepatic cancer, and/or cirrhosis of the liver.

In another embodiment, the subject has intestinal inflammation. Such intestinal inflammation may include, but is not limited to Crohn's disease, ulcerative colitis, collagenous-, lymphocytic-, ischemic-, diversion- and indeterminate colitis, and Behcet's disease.

In one embodiment, the MT inhibitor, including but not limited to an anti-MT antibody, may be linked to a pancreatic cell targeting moiety, to specifically target pancreatic cells producing MT, such as pancreatic beta cells. This embodiment will be particularly useful for treating or limiting development of T1D, T2D, pre-diabetes, and/or impaired glucose tolerance. In one embodiment, the pancreatic β cell specific targeting moiety comprises one or more peptides or other moieties that preferentially bind pancreatic β cells, including but not limited to glucagon-like peptide-1 (GLP-1), glucagon-like peptide-2 (GLP-2), peptide YY (PYY), neuropeptide Y (NPY), pancreatic peptide (PPY), and exendin-4. Exemplary amino acid sequences of such targeting moieties are provided in Table 3.

TABLE 3

```
Glucagon-like peptide 1; GLP1(aa92-128)
HDEFERHAEGTFTSDVSSYLEGQAAKEFIAWLVKGRG
(SEQ ID NO: 17)

Glucagon-like peptide 2; GLP2(aa146-178)
HADGSFSDEMNTILDNLAARDFINWLIQTKITD
(SEQ ID NO: 18)

pancreatic peptide (PPY)
MAAARLCLSLLLLSTCVALLLQPLLGAQGAPLEPVYPGDNATPEQMAQYA
ADLRRYINMLTRPRYGKRHKEDTLAFSEWGSPHAAVPRELSPLDL
(SEQ ID NO: 19)

neuropeptide Y (NPY)
MLGNKRLGLSGLTLALSLLVCLGALAEAYPSKPDNPGEDAPAEDMARYYS
ALRHYINLITRQRYGKRSSPETLISDLLMRESTENVPRTRLEDPAMW
(SEQ ID NO: 20)

peptide YY (PYY)
MVFVRRPWPALTTVLLALLVCLGALVDAYPIKPEAPGEDASPEELNRYYA
SLRHYLNLVTRQRYGKRDGPDTLLSKTFFPDGEDRPVRSRSEGPDLW
(SEQ ID NO: 21)

exendin-4
MKIILWLCVFGLFLATLFPISWQMPVESGLSSEDSASSESFASKIKRHGE
GTFTSDLSKQMEEEAVRLFIEWLKNGGPSSGAPPPSG
(SEQ ID NO: 22)
```

Attaching the pancreatic cell targeting moiety to the MT inhibitor, including but not limited to the MT antibody or fragment thereof, may be accomplished by any chemical reaction that will bind the two molecules so long as the pancreatic cell targeting moiety and the MT antibody or fragment thereof, retain their respective activities. In one embodiment where the extracellular MT inhibitor comprises an antibody or fragment thereof, the composition comprises a recombinant fusion protein. In other embodiments, a linkage between the pancreatic cell targeting moiety and the MT antibody or fragment thereof can include many chemical mechanisms, for instance covalent binding, affinity binding, intercalation, coordinate binding and complexation. Covalent binding can be achieved either by direct condensation of existing side chains or by the incorporation of external bridging molecules. Many bivalent or polyvalent linking agents are useful in coupling protein molecules, such as the antibodies, to other molecules. For example, representative, non-limiting examples of coupling agents can be organic compounds such as thioesters, carbodiimides, succinimide esters, disocyanates, glutaraldehydes, diazobenzenes and hexamethylene diamines.

In all embodiments, the subject may be any subject that can benefit from the methods of treatment disclosed herein, including mammals, humans, cattle, dogs, cats, horses, chickens, and so on. In one embodiment, the subject is human.

The compositions for administration are typically formulated as a pharmaceutical composition to include a pharmaceutically acceptable carrier. Suitable acids which are capable of forming pharmaceutically acceptable salts include inorganic acids such as hydrochloric acid, hydrobromic acid, perchloric acid, nitric acid, thiocyanic acid, sulfuric acid, phosphoric acid and the like; and organic acids such as formic acid, acetic acid, propionic acid, glycolic acid, lactic acid, pyruvic acid, oxalic acid, malonic acid, succinic acid, maleic acid, fumaric acid, anthranilic acid, cinnamic acid, naphthalene sulfonic acid, sulfanilic acid and the like. Suitable bases capable of forming such salts include inorganic bases such as sodium hydroxide, ammonium hydroxide, potassium hydroxide and the like; and organic bases such as mono-, di- and tri-alkyl and aryl amines (e.g., triethylamine, diisopropyl amine, methyl amine, dimethyl amine and the like) and optionally substituted ethanolamines (e.g., ethanolamine, diethanolamine and the like).

The pharmaceutical composition may comprise in addition to the composition and carrier (a) a lyoprotectant; (b) a surfactant; (c) a bulking agent; (d) a tonicity adjusting agent; (e) a stabilizer; (f) a preservative and/or (g) a buffer. In some embodiments, the buffer in the pharmaceutical composition is a Tris buffer, a histidine buffer, a phosphate buffer, a citrate buffer or an acetate buffer. The pharmaceutical composition may also include a lyoprotectant, e.g. sucrose, sorbitol or trehalose. In certain embodiments, the pharmaceutical composition includes a preservative e.g. benzalkonium chloride, benzethonium, chlorohexidine, phenol, m-cresol, benzyl alcohol, methylparaben, propylparaben, chlorobutanol, o-cresol, p-cresol, chlorocresol, phenylmercuric nitrate, thimerosal, benzoic acid, and various mixtures thereof. In other embodiments, the pharmaceutical composition includes a bulking agent, like glycine. In yet other embodiments, the pharmaceutical composition includes a surfactant e.g., polysorbate-20, polysorbate-40, polysorbate-60, polysorbate-65, polysorbate-80 polysorbate-85, poloxamer-188, sorbitan monolaurate, sorbitan monopalmitate, sorbitan monostearate, sorbitan monooleate, sorbitan trilaurate, sorbitan tristearate, sorbitan trioleaste, or a combination thereof. The pharmaceutical composition may also include a tonicity adjusting agent, e.g., a compound that renders the formulation substantially isotonic or isoosmotic with human blood. Exemplary tonicity adjusting agents include sucrose, sorbitol, glycine, methionine, mannitol, dextrose, inositol, sodium chloride, arginine and arginine hydrochloride. In other embodiments, the pharmaceutical composition additionally includes a stabilizer, e.g., a molecule which, when combined with a protein-based composition substantially prevents or reduces chemical and/or physical instability of the protein in lyophilized or liquid form. Exemplary stabilizers include sucrose, sorbitol, glycine, inositol, sodium chloride, methionine, arginine, and arginine hydrochloride.

The compositions can be administered via any suitable route, including orally, parentally, by inhalation spray, rectally, or topically in dosage unit formulations containing conventional pharmaceutically acceptable carriers, adjuvants, and vehicles. The term parenteral as used herein includes, subcutaneous, intravenous, intra-arterial, intramuscular, intrasternal, intratendinous, intraspinal, intracranial, intrathoracic, infusion techniques or intraperitoneally. Dosage regimens can be adjusted to provide the optimum desired response (e.g., a therapeutic or prophylactic response). A suitable dosage range may, for instance, be 0.1 ug/kg-100 mg/kg body weight; alternatively, it may be 0.5 ug/kg to 50 mg/kg; 1 µg/kg to 25 mg/kg, or 5 µg/kg to 10 mg/kg body weight. The compositions can be delivered in a single bolus, or may be administered more than once (e.g., 2, 3, 4, 5, or more times) as determined by attending medical personnel. The compositions may be the sole therapeutic administered, or may be administered together with one or more other therapeutic (either separately or as a combination) as deemed appropriate by attending medical personnel. In one non-limiting embodiment, the subject has or is at risk of T1D and the inhibitor may be used together with one or more of insulin, metformin, or pramlintide. In another embodiment, the subject has or is at risk of T2D, pre-diabetes, and/or impaired glucose tolerance, and the inhibitor may be used together with one or more of metformin, sulfonylureas (including but not limited to glyburide, glipizide, and glimepiride), meglitinides (including but not limited to repaglinide and nateglinide), thiazolidinediones (including but not limited to rosiglitazone and pioglitazone), DPP-4 inhibitors (including but not limited to sitagliptin, saxagliptin, and linagliptin), GLP-1 receptor agonists (including but not limited to exenatide, liraglutide, and semaglutide), SGLT2 inhibitors (including but not limited to canagliflozin, dapagliflozin, and empagliflozin), or insulin. In one non-limiting embodiment, the subject has or is at risk of hepatitis, and the inhibitor may be used in combination with one or more of entecavir, tenofovir, lamivudine, adefovir, telbivudine, simeprevir, sofosbuvir, interferon or ribavirin.

In another embodiment, compositions are provided comprising
  (a) an anti-metallothionein antibody disclosed herein; and
  (b) one or more of insulin, metformin, pramlintide, a sulfonylurea (including but not limited to glyburide, glipizide, and glimepiride), a meglitinide (including but not limited to repaglinide and nateglinide), a thiazolidinedione (including but not limited to rosiglitazone and pioglitazone), a DPP-4 inhibitor (including but not limited to sitagliptin, saxagliptin, and linagliptin), a GLP-1 receptor agonist (including but not limited to exenatide, liraglutide, and semaglutide), a SGLT2 inhibitor (including but not limited to canagliflozin, dapagliflozin, and empagliflozin), entecavir, tenofovir, lamivudine, adefovir, telbivudine, simeprevir, sofosbuvir, interferon or ribavirin. The compositions may be used, for example, in the methods of the disclosure. All embodiments and combinations of embodiments of antibodies disclosed above are suitable for inclusion in the compositions of this aspect. In one embodiment, the anti-MT antibody or an antigen-binding fragment thereof comprises a monoclonal antibody or an antigen binding fragment thereof. In another embodiment the anti-MT antibody comprises a humanized anti-MT antibody, or an antigen binding fragment thereof.

In another aspect, the disclosure provides compositions, comprising:
  (a) an anti-metallothionein antibody disclosed herein; and
  (b) a pancreatic or hepatic cell targeting moiety linked to the inhibitor of extracellular human MT.

The compositions may be used, for example, in the methods of the disclosure. All embodiments and combinations of embodiments of antibodies disclosed above are suitable for inclusion in the compositions of this aspect. In one embodiment, the anti-MT antibody or an antigen-binding fragment thereof comprises a monoclonal antibody or an antigen binding fragment thereof. In another embodiment the anti-MT antibody comprises a humanized anti-MT antibody, or an antigen binding fragment thereof.

In one embodiment, the cell targeting moiety is a hepatic cell targeting moiety. In exemplary such embodiments, wherein the hepatic cell targeting moiety includes but is not limited to circumsporozoite protein (CSP), CSP region I, CSP region I-plus, lactosaminated human serum albumin, glycosylated lipoprotein, and/or arabinogalactan. In one embodiment, the hepatic cell binding moiety is peptidic and selected from CSP, CSP region I, CSP region I plus, or hepatic cell binding fragments thereof. CSP targets *Plasmodium* sporozoite to the liver is attributed to the circumsporozoite protein (CSP), which is present on the surface of *Plasmodium* sporozoite (Rathore D, et al. *The Journal of Biological Chemistry*. 2005; 280 (21): 20524-20529) CSP is approximately 400 amino acids long organized into three domains: the N-terminal domain containing a conserved KLKQP motif named "region I", a highly repetitive central domain, and a C-terminal domain containing another conserved sequence named "region II" (Singh et al. Cell. 2007; 131 (3): 492-504). In addition to the conserved region I KLKQP sequence, the N-terminal region also contains upstream from region I, two consensus heparin sulfate binding sequences. Peptides containing both the conserved region I amino acids and two consensus heparin binding sequences upstream from region I have been named "region I-plus" (Prudêncio et al., *Nature Reviews Microbiology*. 2006; 4 (11): 849-856).

In another embodiment, the cell targeting moiety is a pancreatic cell targeting moiety, including but not limited to glucagon-like peptide-1 (GLP-1), glucagon-like peptide-2 (GLP-2), peptide YY (PYY), neuropeptide Y (NPY), pancreatic peptide (PPY), and exendin-4; exemplary amino acid sequences for such peptides are described above.

Attaching the cell targeting moiety to the anti-MT antibody or fragment thereof, may be accomplished by any chemical reaction that will bind the two molecules so long as the cell targeting moiety and the anti-MT antibody or fragment thereof, retain their respective activities. In one embodiment, the composition comprises a recombinant fusion protein. In other embodiments, a linkage between the cell targeting moiety and anti-MT antibody or fragment thereof can include many chemical mechanisms, for instance covalent binding, affinity binding, intercalation, coordinate binding and complexation. Covalent binding can be achieved either by direct condensation of existing side chains or by the incorporation of external bridging molecules. Many bivalent or polyvalent linking agents are useful in coupling protein molecules, such as the antibodies, to other molecules. For example, representative, non-limiting examples of coupling agents can be organic compounds such as thioesters, carbodiimides, succinimide esters, diisocyanates, glutaraldehydes, diazobenzenes and hexamethylene diamines.

In all embodiments, the subject may be any subject that can benefit from the methods of treatment disclosed herein, including mammals, humans, cattle, dogs, cats, horses, chickens, and so on. In one embodiment, the subject is human.

Examples

Humanizing the UC1MT Monoclonal Anti-Metallothionein Antibody

The mouse UC1MT monoclonal anti-metallothionein (MT) antibody was humanized using sequences PromabKV6,10 (light chain) and MHC2822HC/Promab (heavy chain). Three human light chain sequences and 5 human heavy chain sequences were designed. The sequences were roughly designed in a nested manner, from more to fewer changes. The heavy chain and light chain designs were tested in all possible pairwise combinations along with the parental V regions, resulting in 24 combinations. The constant regions used were consensus human heavy chains and are shared by all of the heavy and light chains used in these permutations.

Parental Sequences of the Original UC1MT Mouse Hybridoma (of the V Region of the Heavy and Light Chains)

```
A. Primary UC1MT hybridoma source sequences for
the heavy chain (ProMab)
                                        (SEQ ID NO: 23)
GSEVKLQESGPCLVQPSQSLSITCTVSGFSLSRYGVHWVRQSPVKGLEW

LGVIWSGGSTDYNAAFISRLSINKDNSKSQVFFKMHSLQTYDTARYYCA

RW_LLPGYFDVWGAGTTVTVSS (Lake MHC2822HC replicated sequence to original
ProMab sequence):
                                        (SEQ ID NO: 24)
QVQLTQSGPGLVQPSQSLSITCTVSGFSLSRYGVHWVRQSPVKGLEWLG

VIWSGGSTDYNAAFISRLSINKDNSKSQVFFKMHSLQTYDTARYYCAR

W_LLPGYFDVWGAGTTVTVSS

Light chain source sequence from original UC1MT
hybridoma for the CDRs (underlined)
                                        (SEQ ID NO: 25)
AVLMSQTPLSLPVSLGDQASISCRSSQSIVHSNGNTYLEWYLQKPGQSP

KLLIYKVSNRFSGVPDRFSGSGSGTDFTLKISRVEAEDLGIYYCFQGSH

VP_FAFGSGTKLEIE
```

Sequence Design Considerations

The starting sequences were first compared to the mouse germline V regions to identify potential mutations in the framework regions that could cause poor folding. The heavy chain was most similar to the murine IGHV2-2 germline sequence and J1 J chain. Four mutations in the framework regions were noted. The light chain was most similar to the murine Ig kappa light chains IGKV6-13 and IGKV6-15. Six mutations were noted. Also, there appeared to have been a cross-over event between IGKV6-13 and IGKV6-15 near the 5' end of the coding sequence to generate the final light chain sequence. The J5 light chain murine J region appears to have been used.

Sequences were mutated for codon usage in human immunoglobulins, sequences were also selected with small, medium and larger numbers of modifications, and sequences were mutated to orient the antigen binding regions (ABR)/complementary determining regions (CDR) toward the antigen binding pocket of the antibody Each of these 3 humanized light chains and 5 humanized heavy chains generated was co-expressed in H,L pairwise fashion in HEK 294 cells, and immunoglobulin was affinity-purified from these cells. These antibodies were tested against MT in a standard ELISA, and results are shown in FIG. 3. Combinations of humanized heavy and light chain bind to metallothionein, with some differences in the binding potential between the different permutations of H and L chains. When the parental sequences of mouse H and L V regions are combined with human immunoglobulin H and L constant regions, the antibodies perform similarly, so variations in the constant regions do not significantly contribute to antigen recognition.

We used software to identify the antigen binding regions complementarity determining regions (CDRs), which are described herein as SEQ ID NOS: 1-6. (See Kunik V, et al., (2012). PLOS Comput Biol 8 (2): e1002388. doi: 10.1371/journal.pcbi.1002388; Kunik V, et al., Y (2012). Nucleic Acids Res. 2012 July; 40 (Web Server issue): W521-4.)

We evaluated the humanized antibodies showing the best reactivity with MT for their binding to other metalloproteins (alcohol dehydrogenase (ADH), carbonic anhydrase (CA), superoxide dismutase (SOD), Cytochrome C Oxide (CC), metallothionein (MT) and human insulin). All of the tested antibodies retain high specificity for MT (data not shown).

Figure 4A:
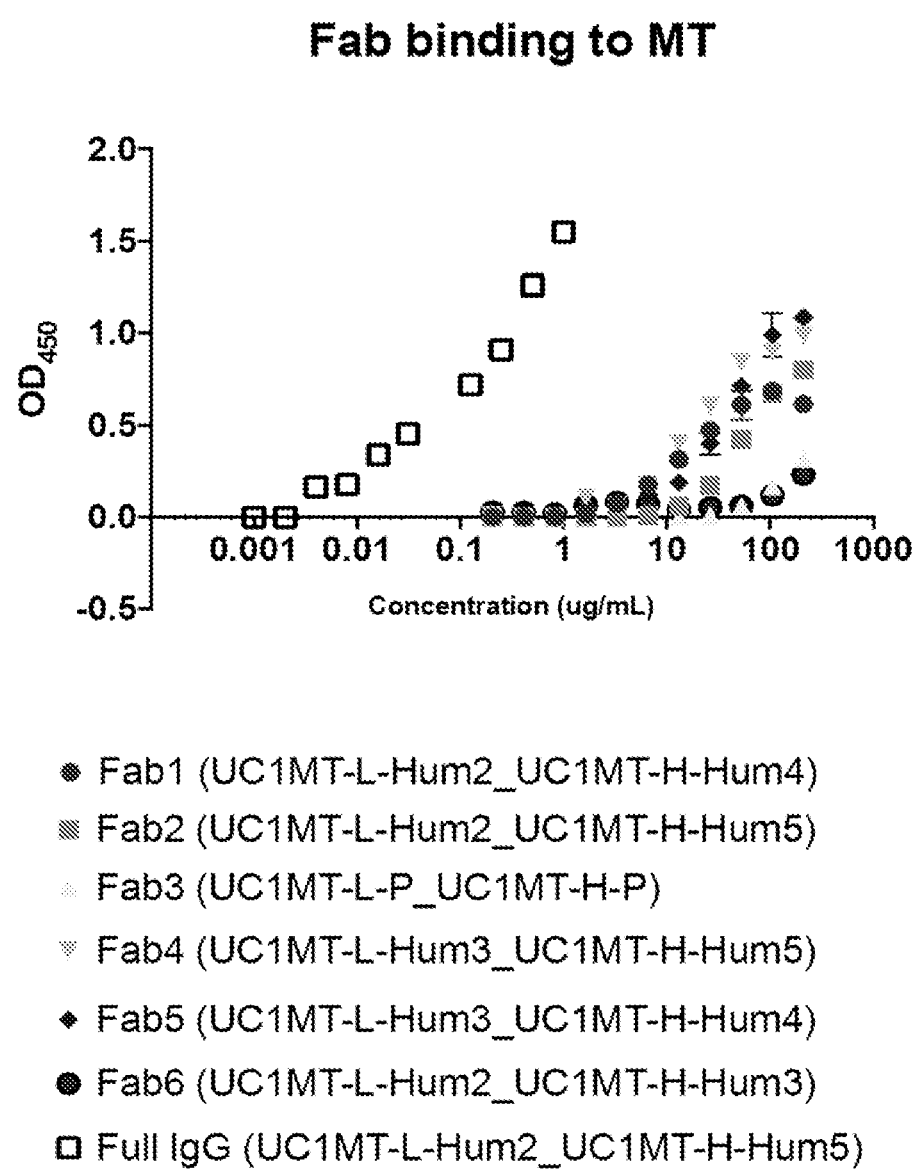
FIG. 4A-B. (A) Graph of Fab' fragment binding to metallothionein from in silico modeling. (B) Individual CDRs are indicated for both the H and L chain of a representative humanized Fab fragment.
Figure 4B:
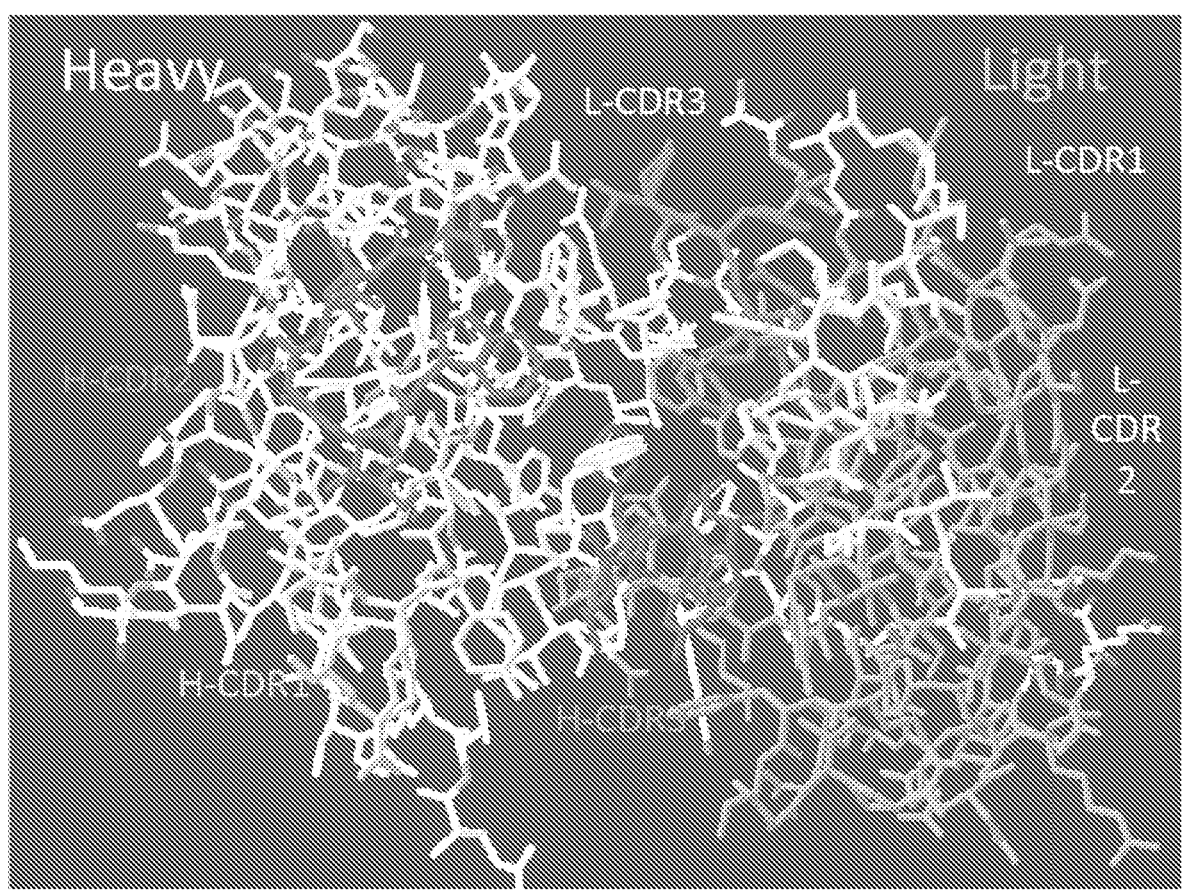

Finally, Fab' fragments were made of the best binding versions of heavy and light chain combinations, and binding to metallothionein tested. Data is presented in FIG. 4, showing that they bind to metallothionein with improved binding relative to Fab' fragments of parental UC1MT.

I claim:

1. An isolated anti-metallothionein antibody, or fragment thereof, comprising
three light chain complementarity determining regions (LCDR1, LCDR2 and LCDR3) and three heavy chain complementarity determining regions (HCDR1, HCDR2 and HCDR3), wherein LCDRs 1-3 comprise an amino acid sequence of SEQ ID NO: 1, KVS, SEQ ID NO: 3, respectively, and HCDRs 1-3 comprise an amino acid sequence of SEQ ID NOs: 4-6, respectively.

2. The isolated antibody or fragment thereof of claim 1, wherein the antibody is a monoclonal antibody, or fragment thereof.

3. The isolated antibody or fragment thereof of claim 1, wherein the antibody is a humanized antibody, or fragment thereof.

4. The isolated anti-metallothionein antibody, or fragment thereof, of claim 1, comprising a light chain comprising an amino acid sequence selected from the group consisting of SEQ ID NOS: 7-9.

5. The isolated anti-metallothionein antibody, or fragment thereof, of claim 4, comprising a light chain comprising the amino acid sequence at least 60%, 65%, 70%, 75%, 80%, 85%, 90%, 91%, 92%, 93%, 94%, 95%, 96%, 97%, 98%, 99%, or 100% identical to the amino acid sequence of SEQ ID NO: 8, and wherein the light chain comprises at least 1, 2, 3, 4, 5, 6, 7, 8, 9, 10, 11, 12, or all 13 of the following residues: D1, V3, T5, S7, T14, Q17, P18, R44, R50, V88, V90, Q105, and K112.

6. The isolated anti-metallothionein antibody, or fragment thereof of claim 4, wherein the light chain further comprises a kappa constant region from a human light chain, comprising the amino acid sequence of SEQ ID NO:10.

7. The isolated anti-metallothionein antibody, or fragment thereof, of claim 1, comprising a heavy chain comprising an amino acid sequence selected from the group consisting of SEQ ID NOS: 11-15.

8. The isolated anti-metallothionein antibody or fragment thereof of claim 7, comprising a heavy chain comprising the amino acid sequence SEQ ID NO: 14.

9. The isolated anti-metallothionein antibody or fragment thereof of claim 7, comprising a heavy chain comprising amino acid sequence of SEQ ID NO: 15.

10. The isolated anti-metallothionein antibody or fragment thereof of claim 7, wherein the heavy chain further comprises a human IgG1 constant sequence, comprising the amino acid sequence of SEQ ID NO:16.

11. The isolated anti-metallothionein antibody or fragment thereof of claim 1, comprising:
(a) a light chain comprising an amino acid sequence selected from the group consisting of SEQ ID NOS: 7-9; and
(b) a heavy chain comprising an amino acid sequence selected from the group consisting of SEQ ID NOS: 11-15.

12. The isolated anti-metallothionein antibody or fragment thereof of claim 1, comprising:

(a) a light chain comprising the amino acid sequence of SEQ ID NO: 8; and
(b) a heavy chain comprising an amino acid sequence selected from the group consisting of SEQ ID NOS: 14-15.

13. The isolated anti-metallothionein antibody or fragment thereof of claim 11, wherein the antibody is a monoclonal antibody, or fragment thereof, and/or a humanized antibody or fragment thereof.

14. The isolated anti-metallothionein antibody or fragment thereof of claim 1, wherein the antibody comprises a Fab' fragment.

15. A nucleic acid encoding the isolated antibody or fragment thereof of claim 1.

16. A vector comprising the nucleic acid of claim 15.

17. A host cell comprising the vector of claim 16.

18. A pharmaceutical composition, comprising
(a) the isolated antibody or fragment thereof of claim 1; and
(b) a pharmaceutically acceptable carrier.

* * * * *